United States Patent
Koda et al.

(10) Patent No.: US 7,551,542 B2
(45) Date of Patent: *Jun. 23, 2009

(54) INFORMATION RECORDING MEDIUM, INFORMATION RECORDING AND/OR REPRODUCING APPARATUS AND METHOD, COMPUTER PROGRAM FOR CONTROLLING RECORD OR REPRODUCTION, AND DATA STRUCTURE INCLUDING CONTROL SIGNAL

(75) Inventors: Takeshi Koda, Tokorozawa (JP); Nobuyuki Takakuwa, Tokorozawa (JP); Tohru Kanegae, Tokorozawa (JP); Masanori Nakahara, Tokorozawa (JP); Takao Sawabe, Tokorozawa (JP); Yasuko Fukuda, Tokorozawa (JP); Akira Imamura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 553 days.

This patent is subject to a terminal disclaimer.

(21) Appl. No.: 11/392,850

(22) Filed: Mar. 30, 2006

(65) Prior Publication Data

US 2006/0164964 A1    Jul. 27, 2006

Related U.S. Application Data

(62) Division of application No. 10/510,447, filed as application No. PCT/JP03/04454 on Apr. 8, 2003, now Pat. No. 7,319,657.

(30) Foreign Application Priority Data

Apr. 8, 2002    (JP) ............................. 2002-105677

(51) Int. Cl.
G11B 7/24    (2006.01)

(52) U.S. Cl. ..................... 369/275.1; 369/53.2; 386/125
(58) Field of Classification Search ... 369/275.1–275.5, 369/53.2, 53.22, 53.41; 386/125
See application file for complete search history.

(56) References Cited

U.S. PATENT DOCUMENTS 7,319,657 B2 *   1/2008   Koda et al. ............... 369/275.1
7,433,295 B2 *   10/2008  Koda et al. ............... 369/275.1

FOREIGN PATENT DOCUMENTS

| JP | 2000-023082 | 1/2000 |
| JP | 2000-268537 | 9/2000 |
| JP | 2000-312342 | 11/2000 |
| JP | 2001-078149 | 3/2001 |
| JP | 2001-251580 | 9/2001 |
| JP | 2003-022658 | 1/2003 |

* cited by examiner

*Primary Examiner*—Ali Neyzari
(74) *Attorney, Agent, or Firm*—Young & Thompson

(57) ABSTRACT

On an information recording medium, an entire stream including a plurality of portion streams, each of which is provided with content information including still picture information, is multiplexed-and-recorded by a unit of packet. The information recording medium is provided with a file for storing object data, which is provided with a plurality of packets, each of which stores therein a piece of the content information. The information recording medium is further provided with a file for storing information which defines a reproduction sequence of the object data. The object data includes packets, each packet storing therein a piece of respective one of still picture information sets, the still picture information set including still picture information and control information thereof. A display control to the still picture information included in one still picture information set is described by the control information included in another still picture information set.

19 Claims, 28 Drawing Sheets

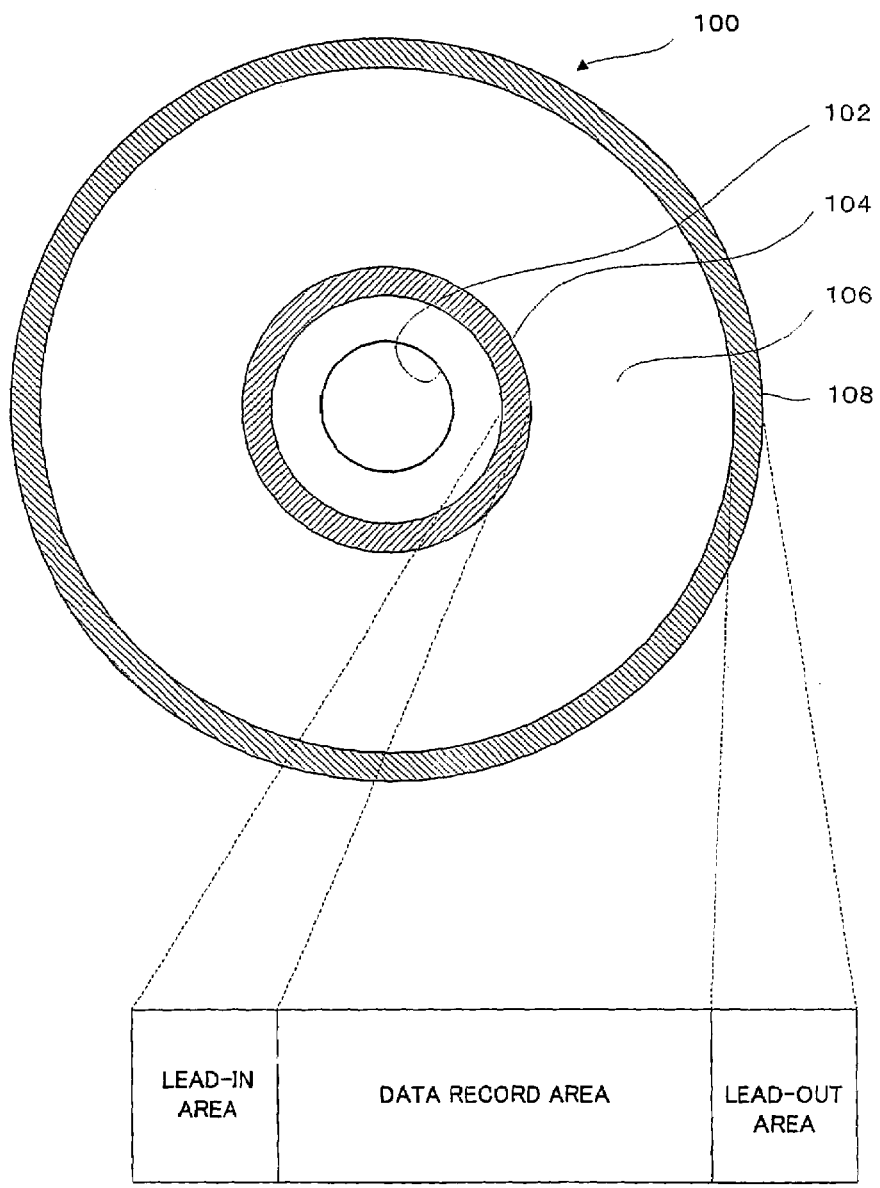

FIG. 14

(ES Address Information of Stream of Index #14)

| Display Start Time Point | Packet Number |
|---|---|
| T14_0 | q |
| T14_1 | r |
| T14_2 | s |
| T14_3 | t |
| T14_4 | u |

FIG. 15

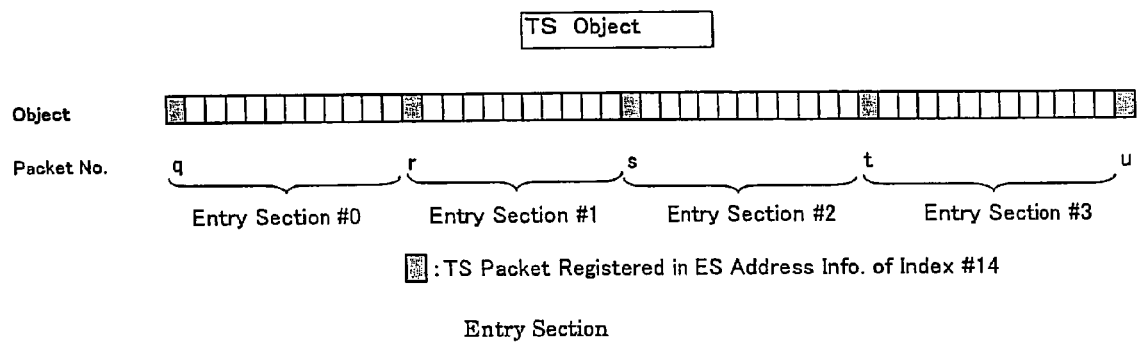

Entry Section

FIG. 16

| | | |
|---|---|---|
| 711 | Structural Information | SP Data Identifier, |
| | | Length of SP Control Info. |
| | | Length of SP Data |
| | | Position Information about SP Data |
| | | Other Info. |
| 712 | SP Control Information | Display Start Time Point of SP Data |
| | | Display Time Length of SP Data |
| | | Other Info. |
| 713 | SP Data | Image Data (Bitmap, JPEG, etc.) |
| | | Other Info. |

Sub-picture Structure

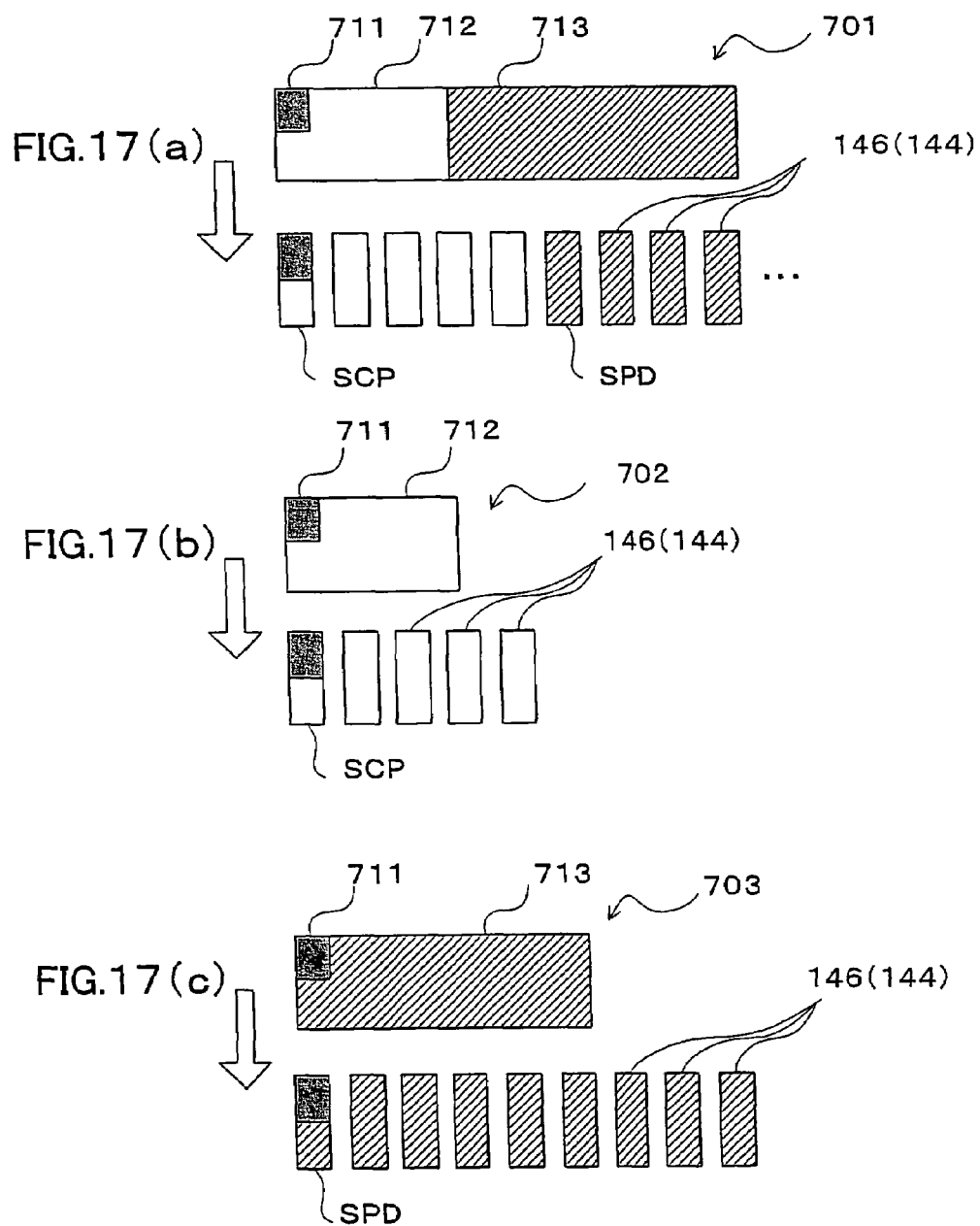

FIG. 20

ES Address Information of Sub-picture Stream of Index #16

| Entry Section | SCP Identification | SP Data Identification | |
|---|---|---|---|
| 0 | 1 | 1 | |
| 1 | 1 | 0 | Reproduction Start Point |
| 2 | 0 | 1 | |
| 3 | 0 | 0 | ⇐ |
| 4 | 1 | 0 | |

FIG. 21

SP Structure

| 711 — Structural Information | SP Data Identifier |
| | Length of SP Control Info. |
| | Length of SP Data |
| | Position Inforamtion of SP Data |
| | Other Info. |
| 712' — SP Control Information | Display Start Time Point of SP Data |
| | Display Time Length of SP Data |
| | The Number of Look-Ahead SP Data (=N_P) |
| | Look-Ahead SP Data Identifier #1 |
| | Position Info. of Look-Ahead SP Data #1 |
| | ... |
| | Look-Ahead SP Data Identifier #N_P |
| | Position Info. of Look-Ahead SP Data #N_P |
| | Other Info. |
| 713 — SP Data | Image Data (Bitmap, JPEG, etc.) |
| | Other Info. |

FIG. 22

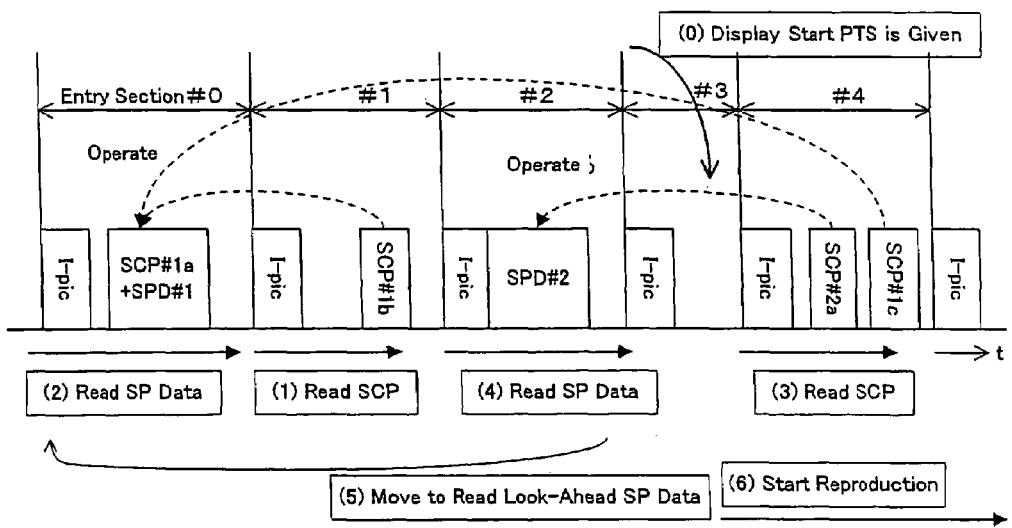

FIG. 23

ES Address Information of Sub-picture Stream of Index #16

| Entry Section | SCP Identification |
|---|---|
| 0 | 1 |
| 1 | 1 |
| 2 | 0 |
| 3 | 0 | ← Reproduction Start Point
| 4 | 1 |

FIG. 24

| | | |
|---|---|---|
| 711 | Structural Information | SP Data Identifier, |
| | | Length of SP Control Info. |
| | | Length of SP Data |
| | | Position Information of SP Data |
| | | Other Info. |
| 712'' | SP Control Information | Display Start Time Point of SP Data |
| | | Display Time Length of SP Data |
| | | The Number of Look-Ahead SP Data = 1 |
| | | Look-Ahead SP Data Identifier = #1 |
| | | Position Information of Look-Ahead SP Data = Recording Position of SPD#1 (T14_0) |
| | | Other Info. |

FIG. 31

| Field Name | | Description Contents |
|---|---|---|
| Disc Comprehensive Info. | | Disc Volume Info. Total Title Number, etc. |
| Title Info. Table | Title Pointer | Storage Address for Title #1 Info. |
| | | Other Info. about Title #1, such as Title Type |
| | | Storage Address for Title #2 Info. |
| | | Other Info. about Title #1, such as Title Type |
| | | ------ |
| | Title #1 Info. | Head P List Number of Title #1 |
| | | Other Info. about the P list |
| | | Other P list Numbers in Title #1 |
| | | Other Info. about the P list |
| | | ------------------- |
| | Title #2 Info. | Head P List Number of Title #2 |
| | | Other Info. about the P list |
| | | ------------------- |
| | | ---------------------- |
| Other Info. | | |

FIG. 32

Title Information Table — 114

| Field Name | Description Contents |
|---|---|
| Title Pointer | Storage Address for Title #1 Info. |
| | Title Type = one P list Title, i.e., the Number of Entire P Lists = 1 |
| | Other Information |
| | Storage Address for Title #2 Info. |
| | Title Type = one P list Title, i.e., the Number of Entire P Lists = 1 |
| | Other Information |
| Title #1 Info. | Head P List Number = 1 |
| | Other Information about the List, such as Chapter Information |
| Title #2 Info. | Head P List Number = 2 |
| | Other Information about the List, such as Chapter Information |

FIG. 34

| Object Information Table | 131 | | | |
|---|---|---|---|---|
| AU Table | | | | |
| Field Name | | | | Contents |
| AU Table Comprehensive Information | | | | the Number of AUs, Pointer to Each AU, etc. |
| | AU#1 | PU#1 | ES_Table Index#1 | Index Number of ES_map table=1 |
| | | | ES_Table Index#2 | 3 |
| | 1321 | PU#2 | ES_Table Index#1 | 4 |
| | | | ES_Table Index#2 | 5 |
| | AU#2 | PU#1 | ES_Table Index#1 | 9 |
| | | | ES_Table Index#2 | 10 |
| | | PU#2 | ES_Table Index#1 | 12 |
| | | | ES_Table Index#2 | 13 |
| | AU#3 | PU#1 | ES_Table Index#1 | 14 |
| | | | ES_Table Index#2 | 15 |
| | 3021 | | ES_Table Index#3 | 16 |
| | | | ES_Table Index#4 | 17 |
| | | | ES_Table Index#5 | 18 |
| Other Info. | | | | Postion of ES_Map table, etc. |

134

| ES_Map Table | | |
|---|---|---|
| Field Name | | Contents |
| | ES_Map Table Comprehensive Information | Index Number, etc. |
| | Index #1 | ES_PID Value=101 |
| | | Address Information |
| | Index #2 | ES_PID=102 |
| | | Address Information |
| | Index #3 | ES_PID=103 |
| | | Address Information |
| | Index #4 | ES_PID=201 |
| | | Address Information |
| | Index #5 | ES_PID=202 |
| | | Address Information |
| | Index #6 | ES_PID=301 |
| | | Address Information |
| | Index #7 | ES_PID=302 |
| | | Address Information |
| | Index #8 | ES_PID=303 |
| | | Address Information |
| | Index #9 | ES_PID=201 |
| | | Address Information |
| | Index #10 | ES_PID=202 |
| | | Address Information |
| | Index #11 | ES_PID=203 |
| | | Address Information |
| | Index #12 | ES_PID=101 |
| | | Address Information |
| | Index #13 | ES_PID=102 |
| | | Address Information |
| | Index #14 | ES_PID=101 |
| | | Address Information |
| | Index #15 | ES_PID=102 (134d) |
| | | Address Information |
| | Index #16 | ES_PID=103 |
| | | Address Information |
| | | 134e — Index Number of ES_map table of Stream Used as Entry Section =14 |
| | Index #17 | ES_PID=104 |
| | | Address Information |
| | Index #18 | ES_PID=105 |
| | | Address Information |
| | Other Info. | Other Info. |

INFORMATION RECORDING MEDIUM, INFORMATION RECORDING AND/OR REPRODUCING APPARATUS AND METHOD, COMPUTER PROGRAM FOR CONTROLLING RECORD OR REPRODUCTION, AND DATA STRUCTURE INCLUDING CONTROL SIGNAL

This application is a division of co-pending application Ser. No. 10/510,447, filed on Sep. 26, 2005. application Ser. No. 10/510,447 is the national phase of PCT International Application No. PCT/JP03/04454 filed on Apr. 8, 2003 under 35 U.S.C. § 371, which claims priority of Japanese Application No. 2002-105677 filed Apr. 8, 2002. The entire contents of each of the above-identified applications are hereby incorporated by reference.

TECHNICAL FIELD

The present invention relates to: an information recording medium, such as a high-density optical disc, on which various information can be recorded at high density, such as main picture information or video information, audio information, sub picture information, and reproduction control information; an apparatus for and a method of recording the information onto the information recording medium; an apparatus for and a method of reproducing the information from the information recording medium; an apparatus and a method capable of both recording and reproducing the information, a computer program for controlling the record or the reproduction, and a data structure including a control signal for controlling the reproduction.

BACKGROUND ART

DVDs are generalized as optical discs on which various information is recorded, such as the video information, the audio information, the sub picture information, and the reproduction control information. According to the DVD standard, the video information (e.g. video data), the audio information (e.g. audio data), and the sub picture information (e.g. sub picture data) are individually packetized with the reproduction control information (e.g. navigation data) and are multiplexed and recorded on a disc in the "program stream" format of the MPEG 2 (Moving Picture Experts Group phase 2) standard, which is a highly efficient encoding technique. In the video information among them, there is only one stream of data compressed according to the MPEG video format (ISO 13818-2) within one program stream. On the other hand, the audio information is recorded in a plurality of methods (namely, linear PCM, AC-3, MPEG audio, and the like). The audio information can exist up to 8 streams within one program stream. The sub picture information is defined with a bitmap and is compressed and recorded in a run-length method. The sub picture information can exist up to 32 streams within one program stream. In the case of the DVD, as described above, a plurality of streams of the chooseable or selectable audio information (e.g. streams of a stereo sound, a surrounding sound, an original English sound, a dubbed Japanese sound, and the like) and a plurality of streams of the chooseable or selectable sub picture information (e.g. streams of Japanese subtitle, English subtitle, and the like) are multiplexed and recorded by using the program stream format, for one stream of the video information in one movie or film, for example.

On the other hand, the "transport stream" format of the MPEG 2 standard has been recently standardized, and this is appropriate for data transmission. According to this transport stream format, a plurality of "elementary streams" are transmitted at the same time. For example, a plurality of shows or programs, such as many TV channels of satellite digital broadcasting, are time-division-multiplexed to one satellite wave and are transmitted at the same time.

DISCLOSURE OF INVENTION

However, in the above described DVD, although the main picture of one stream can be multiplexed and recorded with the audio information, the sub picture information, and the like of a plurality of streams, the video of the plurality of streams cannot be multiplexed and recorded. Namely, the DVD, on which recording is performed on the basis of the program stream format of the MPEG 2, has such a problem that a plurality of shows or programs cannot be essentially multiplexed and recorded thereon, which are transmitted at that same time in the transport stream format of the MPEG 2 as described above.

Moreover, even if there is a disc which has such a high transmission rate and has such a high recording capacity or such a high recording density as to be capable of recording at the same time the plurality of shows or programs transmitted in the transport stream format of the MPEG 2, it is inappropriate, in terms of data efficiency, to record and reproduce still-picture information having a large data amount, such as the above-described bitmap data, frequently, with respect to a reproduction time axis. Particularly, if broadcasting is received in real time and is only displayed through a tuner, such display processing of the still picture information is relatively simple. However, after recorded into a disc as one of the elementary streams, the still picture information is regarded, by its nature, as the object of interactive reproduction, special reproduction, such as time search and chapter search by a user, or the like. In some cases, this greatly increases a load to the reproduction and display processing of the still picture information or the like, which is provided with the bitmap data having a large data amount. In order to deal with this circumstance, there arises a need to dramatically improve hardware performances or the like only for the processing of the still picture information. Alternatively, with respect to the still picture information, there arises such a technical problem that its image or picture quality deteriorates or that the special reproduction or the interactive reproduction is limited.

It is therefore an object of the present invention to provide an information recording medium, an apparatus for and a method of recording information, an apparatus for and a method of reproducing the information, an apparatus for and a method of recording and reproducing the information, a computer program for controlling the record or the reproduction, and a data structure including a control signal for controlling the reproduction, which make it possible to multiplex and record the still picture information having a relatively large data amount along with motion picture information (or the video information) and the audio information or the like and which make it possible to reproduce the still picture information while inhibiting an increase in the load in the reproduction and display processing.

The above object of the present invention can be achieved by an information recording medium on which a plurality of content information, which includes still picture information constituting a series of contents, is multiplexed-and-recorded by a unit of packet, which is a physically accessible unit, the information recording medium provided with: an object data file, which is a logically accessible unit, for storing object data which comprises a plurality of packets including packets each storing therein a piece of the content information; a reproduction sequence information file for storing reproduction sequence information which defines a reproduction sequence of the object data; and an object information file for storing, as reproduction control information for controlling reproduction of the object data, correspondence definition information for defining a correspondence relationship between the plurality of packets which are multiplexed and the plurality of content information, wherein the plurality of packets constituting the object data include packets each storing therein a piece of respective one of still picture information sets, the still picture information set including at least one of the still picture information and still picture control information for controlling display of the still picture information and further including structural information for indicating a structures of the still picture information set, and with respect to at least one portion of the still picture information, a display control to the still picture information included in one still picture information set out of the still picture information sets is described by the still picture control information included in another still picture information set out of the still picture information sets.

According to the information recording medium of the present invention, the object data file is a logically accessible unit by an information reproducing apparatus and stores the object data constructed by a plurality of packets (e.g. TS packets described later), each of which stores therein a piece of the content information including the still picture information. The reproduction sequence information file stores the reproduction sequence information (e.g. play list information), which defines the reproduction sequence of the object data. The object information file stores the correspondence definition information (e.g. a ES map table, ES_PID (ES packet ID) and ES address information included in the ES map table, or an AU table or the like, which will be described later) for defining a correspondence relationship between the plurality of packets which are multiplexed and the plurality of content information.

Therefore, in reproducing, it is possible to selectively reproduce one or the plurality of content information which are desired out of a plurality of contents on the basis of the correspondence definition information. At this time, it is possible to perform the reproduction as in the scheduled reproduction sequence on the basis of the reproduction sequence information.

As opposed to the case of the object data file, various information stored in the object information file and the reproduction sequence information file are not multiplexed by the unit of packet on the information recording medium. Therefore, it is possible to relatively easily reproduce the object data on the information reproducing apparatus on the basis of the reproduction control information and the reproduction sequence information.

Particularly in the present invention, the plurality of packets constituting the object data includes packets each storing therein respective one of the still picture information sets. Here, the "still picture information set" is an information set including either one or both of the still picture information and the still picture control information and having a predetermined structure in which a data amount is variable or fixed. Therefore, in reproducing, by firstly accessing the structural information having an identifier or the like in the object data file, it is possible to obtain the still picture information and the still picture control information included in the still picture information set for including the structural information in accordance with the content of the accessed structural information. More specifically, even if one still picture information set is divided into the plurality of or many packets, for example, by specifying the address of a head packet in which the identifier of the structural information is disposed (e.g. by counting the packets in the structure), it is possible to specify the addresses of the still picture information and the still picture control information included in the still picture information set. As a result, it is possible to display-control the still picture information on the basis of the still picture control information.

Moreover, in the present invention, particularly with respect to at least one portion of the still picture information, a display control to the still picture information included in one still picture information set is described by the still picture control information included in another still picture information set. Therefore, one still picture information included in one still picture information set can be display-controlled by another still picture control information included in another still picture information set which is recorded separately from the one still picture information set (i.e. placed before or after on the reproduction time axis or alienated from each other as the packet). Moreover, one still picture information included in one still picture information set can be display-controlled in different forms by the other plurality of still picture control information included in the other plurality of still picture information set. Namely, it can be differently displayed by using the same still picture information many times or sharing it, so that it is possible to reduce a data amount required to perform still-picture-display as a whole. It is also possible to simplify the structure of record data. Alternatively, a plurality of still picture information can be differently displayed by using the same still picture control information many times or sharing it.

As described above, as compared to such a conventional technique that the still picture information and the control information thereof are read at each time of displaying the still picture information, which is constructed from, e.g., the bitmap data and the JPEG data, and that the information is deleted in accordance with the end of the display to thereby read the next still picture information and the control information thereof, it is possible to reduce a data processing load for the still-picture-display, and it is possible to improve the usability of the data.

Consequently, it is possible to appropriately reproduce the still picture information, which is included as a sub picture stream in the transport stream of the MPEG 2, for example, along with the other video information and audio information or alone. In this case, if the special reproduction, such as time search, chapter search, fast-forwarding, and rewinding, is performed, i.e., even if the reproduction is started from an arbitrary time point, the still picture information, such as the bitmap and the JPEG, having a relatively large data amount can be efficiently reproduced in any case, along with the motion picture information and the audio information or the like, and an increase in the load in the reproduction processing is inhibited efficiently.

In one aspect of the information recording medium of the present invention, the still picture information set includes at least one of first and third still picture information sets and includes a second still picture information set, out of (i) the first still picture information set for including the still picture information, the still picture control information, and the structural information, (ii) the second still picture information set for including the still picture control information and the structural information but not including the still picture information, and (iii) the third still picture information set for including the still picture information and the structural information but not including the still picture control information.

According to this aspect, there are at most three types of still picture information sets. In any case, in reproducing, by specifying the head packet thereof, it is possible to specify each of the addresses of all the packets constituting each still picture information set, on the basis of the structural information. Moreover, by using the three types of still picture information set, preferably, it is possible to display-control the same still picture information in different forms by the plurality of still picture control information, and it is also possible to display-control the plurality of mutually different still picture information by the same still picture control information.

Moreover, in a simple case, it is possible to perform still-picture-reproduction by a combination of the still picture information and the still picture control information included in the same still picture information set. The specification of the address in this case can be easily performed by specifying the same head packet.

In an aspect associated with the three types of still picture information sets, a display control to the still picture information included in at least one of the first and third still picture information sets is described by the still picture control information included in the second still picture information set.

By constituting in this manner, in reproducing, it is possible to display-control the still picture information included in the first and third still picture information sets, which include the still picture information, on the basis of the still picture control information included in the second still picture information set, which does not include the still picture information.

Incidentally, it is obvious that the display-control to the still picture information included in the first still picture information set may be described by the still picture control information included in the same first still picture information set. Moreover, the display-control to the still picture information included in the third still picture information set may be described by the still picture control information included in the first still picture information set.

Alternatively, in an aspect associated with the three types of still picture information sets, a display control to the still picture information included in at least one of the first and third still picture information sets is described by a plurality of the still picture control information included in a plurality of the second still picture information set, so as to perform a plurality of mutually different display controls.

By constituting in this manner, in reproducing, it is possible to display-control the still picture information included in the first and third still picture information sets, on the basis of the plurality of still picture control information included in the plurality of second still picture information sets, in different forms substantially one after another on the reproduction time axis. Alternatively, according to a conditional branch and a selection operation, it is possible to display-control the same still picture information, at the same reproduction time point, selectively, in different forms.

In another aspect of the information recording medium of the present invention, a packet storing the structural information therein is disposed at a head position of the plurality of packets associated with the still picture information set.

According to this aspect, in reproducing, by searching for and reading the head packet of the still picture information set in the object data file, it is possible to specify the structure of the still picture information set. By this, it is possible to easily specify the packet storing therein the still picture information and the still picture control information, which constitute the still picture information set.

Incidentally, if the amount of information in the structural information is smaller than the packet, it may be constructed such that the entire structural information and one portion of the still picture information or still picture control information are stored in the same head packet, or such that only the structural information is stored in one head packet. Alternatively, if the amount of information in the structural information is larger than the packet, it may be constructed such that the structural information is stored in the plurality of packets.

In another aspect of the information recording medium of the present invention, out of an identifier of the still picture information, a data length of the still picture control information, a data length of the still picture information, and position information for indicating a recording position of the still picture information, the structural information includes at least the identifier.

According to this aspect, by focusing on the entry section specified in reproducing as described later, for example, to thereby search for the "identifier" of the still picture information set in the object data file, it is possible to find out each still picture information set relatively quickly and easily. In particular, with respect to the first still picture information set, it can be specified where the arrangement of the packets storing therein the information ends, on the basis of the data length of the still picture control information and the data length of the still picture information. With respect to the second still picture information set, it can be specified where the arrangement of the packets storing therein the information ends, on the basis of the data length of the still picture control information. With respect to the third still picture information set, it can be specified where the arrangement of the packets storing therein the information ends, on the basis of the data length of the still picture information. In this manner, by following the data length of the still picture information and the data length of the still picture control information, which are the structural information, even if one still picture information set is divided into the plurality of or many packets, by specifying the address of the head packet, it is possible to specify the addresses of the entire packets of the still picture information set. In other words, it is possible to reduce the data amount of the correspondence definition information, particularly, the address information in the packet, which is to be stored in the object information file.

In the case of the second still picture information set, the "position information for indicating a recording position of the still picture information" may be position information for indicating a recording position of the still picture information which is the object of the display control (e.g. the entry section). On the other hand, in the case of the first or third still picture information set, the position information of the still picture information is unnecessary as the still picture information itself is included. In this case, for example, information for indicating to be invalid is written as the position information.

In addition, it is possible to show that the still picture information set is the second still picture information set by setting the data length of the still picture information to be "0" or a predetermined value for indicating to be in valid. Alternatively, it is possible to show that the still picture information set is the third still picture information set by setting the data length of the still picture control information to be "0" or a predetermined value for indicating to be in valid.

In another aspect of the information recording medium of the present invention, the still picture control information includes information for indicating a display start time point of a still picture which is displayed on the basis of the still picture information and information for indicating a display time length of the still picture.

According to this aspect, it is possible to perform the still-picture-reproduction by the corresponding still picture information, on the basis of the information for indicating the display start time point and the display time length of the still picture, which is included in the still picture control information, for a desired time length matched with the will of a producer.

In another aspect of the information recording medium of the present invention, the object data comprises an entire stream which includes a plurality of portion streams, each comprising the content information, and which is multiplexed by a unit of packet, and the still picture information set is included in the object data as one or a plurality of portion streams for the still picture information set.

According to this aspect, the entire stream, such as at least one portion of the transport stream of the MPEG 2, is provided with the plurality of portion streams, such as elementary streams. Each of the portion streams is provided with the content information. Such an entire stream is multiplexed-and-recorded onto the information recording medium, by the unit of packet (e.g. the TS packet described later). The still picture information set is included as one or a plurality of portion streams for the still picture information set (e.g. sub picture streams only for a still picture). Therefore, it is possible to perform the still-picture-display based on the still picture information and the still picture control information by reproducing the portion stream for the still picture information set.

Such an entire stream may include two or more portion streams including the video information as the content information (i.e. video streams). Alternatively, the entire stream may include the portion stream including the video information as the content information, a portion stream including the sub picture information (i.e. the sub picture stream), and a portion stream including the audio information (i.e. an audio stream), which are corresponding to the video information.

Incidentally, in the information recording medium of the present invention, the correspondence definition information may further have table information for indicating, for each content information, a packet identification number which is uniquely given between the plurality of packets multiplexed at the same time point. By constituting in this manner, it is possible to quickly specify to which packet the desired content information correspondences at an arbitrary reproduction time point, by referring to the table information for indicating the packet identification number for each content information (e.g. the ES map table or the ES address information described later). This makes it possible to reproduce the desired portion stream.

In an aspect associated with the entire and portion streams, the correspondence definition information has address information including a serial number, which is associated with the packets constituting each portion stream and satisfying a predetermined condition, and a display start time point corresponding to this, for each of the plurality of portion streams.

By constituting in this manner, it is possible to specify the position of the packet in the object data file on the basis of the serial number of the packets and the display start time point of the packets, to thereby appropriately reproduce the desired portion stream.

Furthermore, in this case, the correspondence definition information may include: a flag for indicating whether or not there is a head packet of the still picture information set for including the still picture information, in an entry section specified by two packets adjacent to each other, in an arrangement of only packets whose positions are specified by the address information out of the plurality of packets constituting the portion stream; and a flag for indicating whether or not there is a head packet of the still picture information set for including the still picture control information, in the entry section.

By constituting in this manner, in reproducing, with respect to the still picture information or the still picture control information, the address information is not directly specified by referring to the correspondence definition information, but instead, the entry section in which the still picture information or the still picture control information exists is specified. After the entry section in which the still picture information or the still picture control information exists is specified, by setting the packet which is actually multiplexed in the object data file and which is in the specified entry section to be a search object, it is possible to find out the still picture information or the still picture control information easily and quickly (e.g. by finding out its header, identifier, or the like).

Here, it is preferable to describe "between two packets" as "between display start time points of the still picture information associated with the two packets", not as "between two serial numbers associated with the two packets". This is because by describing in this manner, even if some packets are removed by an edit operation, to thereby cause a missing or shifted number in the serial number of the packets from the beginning, this does not cause a missing or shifting in the display start time point. However, under circumstances in which such an edit operation or the like can be ignored, "between two packets" may be described as "between two serial numbers associated with the two packets".

Furthermore, in this case, it may be constructed such that if the content information includes video information based on a MPEG 2 (Moving Picture Experts Group phase 2) standard, the address information includes a serial number of the packets associated with an I picture and a display start time point corresponding thereto.

By constituting in this manner, in reproducing, it is possible to specify the address of the packet of interest on the basis of the serial number of the packets associated with the I picture, and it is possible to reproduce the I picture on the basis of the corresponding display start time point. Moreover, on the basis of the I picture, it is possible to reproduce a B picture and a P picture. If there is the audio information corresponding to the video information as described above, the audio information can be reproduced. Namely, it is possible to access the packets associated with the I picture, and moreover, it is possible to access the packets associated with the video information and the audio information related to the accessed I picture. Thus, it is possible to appropriately reproduce a series of contents. Particularly in this case, it is unnecessary to record or write the address information of the packets associated with the B picture and the P picture and the address information of the packet associated with the corresponding audio information, so that it is possible to reduce the amount of the information which is recorded onto the information recording medium as a whole.

The above object of the present invention can be achieved by an information recording apparatus for multiplexing and recording a plurality of content information, which includes still picture information constituting a series of contents, onto an information recording medium by a unit of packet, which is a physically accessible unit, the information recording apparatus provided with: a first recording device for recording an object data file, which is a logically accessible unit, for storing object data which comprises a plurality of packets including packets each storing therein a piece of the content information; a second recording device for recording a reproduction sequence information file for storing reproduction sequence information which defines a reproduction sequence of the object data; and a third recording device for recording an object information file for storing, as reproduction control information for controlling reproduction of the object data, correspondence definition information for defining a correspondence relationship between the plurality of packets which are multiplexed and the plurality of content information, wherein the plurality of packets constituting the object data include packets, each packet storing therein a piece of respective one of still picture information sets each including at least one of the still picture information and still picture control information for controlling display of the still picture information and further including structural information for indicating a structures of the still picture information set, and with respect to at least one portion of the still picture information, a display control to the still picture information included in one still picture information set out of the still picture information sets is described by the still picture control information included in another still picture information set out of the still picture information sets.

According to the information recording apparatus of the present invention, the object data file for storing the object data is recorded by the first recording device, such as a system controller, an encoder, a TS object generator as described later, and an optical pickup. The reproduction sequence information file for storing the reproduction sequence information is recorded by the second recording device, such as a system controller, an encoder, a TS object generator as described later, and an optical pickup. The object information file for storing the correspondence definition information for defining a correspondence relationship between the plurality of packets which are multiplexed and the plurality of content information is recorded by the third recording device, such as a system controller, an encoder, a TS object generator as described later, and an optical pickup, as the reproduction control information. Then, the plurality of packets constituting the object data include packets, each packet storing therein a piece of respective one of the still picture information sets. With respect to at least one portion of the still picture information, the display control to the still picture information included in one still picture information set is described by the still picture control information included in another still picture information set. Therefore, it is possible to multiplex and record various content information, such as at least one portion of the transport stream of the MPEG 2, for example, including the still picture information, such as the bitmap and the JPEG, onto the above-described information recording medium of the present invention.

Incidentally, the information recording apparatus of the present invention can also take various aspects in response to various aspects of the above-described information recording medium of the present invention.

The above object of the present invention can be achieved by an information recording method of multiplexing and recording a plurality of content information, which includes still picture information constituting a series of contents, onto an information recording medium by a unit of packet, which is a physically accessible unit, the information recording method provided with: a first recording process of recording an object data file, which is a logically accessible unit, for storing object data which comprises a plurality of packets including packets each storing therein a piece of the content information; a second recording process of recording a reproduction sequence information file for storing reproduction sequence information which defines a reproduction sequence of the object data; and a third recording process of recording an object information file for storing, as reproduction control information for controlling reproduction of the object data, correspondence definition information for defining a correspondence relationship between the plurality of packets which are multiplexed and the plurality of content information, wherein the plurality of packets constituting the object data include packets, each packet storing therein a piece of respective one of still picture information sets each including at least one of the still picture information and still picture control information for controlling display of the still picture information and further including structural information for indicating a structures of the still picture information set, and with respect to at least one portion of the still picture information, a display control to the still picture information included in one still picture information set out of the still picture information sets is described by the still picture control information included in another still picture information set out of the still picture information sets.

According to the information recording method of the present invention, the object data file for storing the object data is recorded by the first recording process. The reproduction sequence information file for storing the reproduction sequence information is recorded by the second recording process. The object information file for storing the correspondence definition information for defining a correspondence relationship between the plurality of packets which are multiplexed and the plurality of content information is recorded by the third recording process as the reproduction control information. Then, the plurality of packets constituting the object data include packets, each packet storing therein a piece of respective one of the still picture information sets. With respect to at least one portion of the still picture information, the display control to the still picture information included in one still picture information set is described by the still picture control information included in another still picture information set. Therefore, it is possible to multiplex and record various content information, such as at least one portion of the transport stream of the MPEG 2, for example, including the still picture information, such as the bitmap and the JPEG, onto the above-described information recording medium of the present invention.

Incidentally, the information recording method of the present invention can also take various aspects in response to various aspects of the above-described information recording medium of the present invention.

The above object of the present invention can be achieved by an information reproducing apparatus for reproducing the recorded content information from the above-described information recording medium (including its various aspects), the information reproducing apparatus provided with: a reading device for physically reading information from the information recording medium; and a reproducing device for reproducing the object data included in the information read by the reading device on the basis of the reproduction control information and the reproduction sequence information included in the information read by the reading device.

According to the information reproducing apparatus of the present invention, information is physically read by the reading device, such as an optical pickup and a demodulator, from the information recording medium by a unit of packet or the like. Then, the object data included in the read information is reproduced by the reproducing device, such as a system controller, a demultiplexer, and a decoder, on the basis of the reproduction control information and the reproduction sequence information included in this read information. Therefore, it is possible to appropriately reproduce, as a series of content information, the content information multiplexed and recorded on the above-described information recording medium of the present invention. Particularly in this case, the still picture information, such as the bitmap and the JPEG, having a relatively large data amount can be efficiently reproduced, and an increase in the load in the reproduction processing is inhibited efficiently.

Incidentally, the information reproducing apparatus of the present invention can also take various aspects in response to various aspects of the above-described information recording medium of the present invention.

In one aspect of the information reproducing apparatus of the present invention, the reproducing device temporarily stores at least one of the still picture information and the still picture control information into a buffer and performs a display control to the still picture information included in the one still picture information set on the basis of the still picture control information included in the another still picture information set.

According to this aspect, preferably, it is possible to display-control the same still picture information in different forms by the plurality of still picture control information, and it is also possible to display-control the plurality of mutually different still picture information by the same still picture control information.

The above object of the present invention can be achieved by an information reproducing method of reproducing the recorded content information from the above-described information recording medium (including its various aspects), the information reproducing method provided with: a reading process of physically reading information from the information recording medium; and a reproducing process of reproducing the object data included in the information read by the reading process on the basis of the reproduction control information and the reproduction sequence information included in the information read by the reading process.

According to the information reproducing method of the present invention, information is physically read by the reading process from the information recording medium by a unit of packet or the like. Then, the object data included in the read information is reproduced by the reproducing process on the basis of the reproduction control information and the reproduction sequence information included in this read information. Therefore, it is possible to appropriately reproduce, as a series of content information, the content information multiplexed and recorded on the above-described information recording medium of the present invention. Particularly in this case, the still picture information, such as the bitmap and the JPEG, having a relatively large data amount can be efficiently reproduced, and an increase in the load in the reproduction processing is inhibited efficiently.

Incidentally, the information reproducing method of the present invention can also take various aspects in response to various aspects of the above-described information recording medium of the present invention and various aspects of the above-described information reproducing apparatus.

The above object of the present invention can be achieved by an information recording and reproducing apparatus for recording the content information onto the above-described information recording medium (including its various aspects) and reproducing the recorded content information, the information recording and reproducing apparatus provided with: a first recording device for recording the object data file; a second recording device for recording the reproduction sequence information file; a third recording device for recording the object information file; a reading device for physically reading information from the information recording medium; and a reproducing device for reproducing the object data included in the information read by the reading device on the basis of the reproduction control information and the reproduction sequence information included in the information read by the reading device.

According to the information recording and reproducing apparatus of the present invention, as with the above-described information recording apparatus of the present invention, the object data file is multiplexed and recorded by the first recording apparatus. The reproduction sequence information file is recorded by the second recording device. The object information file is recorded by the third recording device. Then, as with the above-described information reproducing apparatus of the present invention, information is physically read by the reading device from the information recording medium. Then, the object data included in the read information is reproduced by the reproducing device on the basis of the reproduction control information and the reproduction sequence information included in this read information. Therefore, it is possible to multiplex and record various content information, such as at least one portion of the transport stream of the MPEG 2, including the still picture information, such as the bitmap and the JPEG, onto the above-described information recording medium of the present invention, and further it is possible to appropriately reproduce the multiplexed and recorded content information, including the still-picture-reproduction.

Incidentally, the information recording and reproducing apparatus of the present invention can also take various aspects in response to various aspects of the above-described information recording medium of the present invention.

The above object of the present invention can be achieved by an information recording and reproducing method of recording content information onto the above-described information recording medium (including its various aspects) and reproducing the recorded content information, the information recording and reproducing method provided with: a first recording process of recording the object data file; a second recording process of recording the reproduction sequence information file; a third recording process of recording the object information file; a reading process of physically reading information from the information recording medium; and a reproducing process of reproducing the object data included in the information read by the reading process on the basis of the reproduction control information and the reproduction sequence information included in the information read by the reading process.

According to the information recording and reproducing method of the present invention, as with the above-described information recording method of the present invention, the object data file is multiplexed and recorded by the first recording process. The reproduction sequence information file is recorded by the second recording process. The object information file is recorded by the third recording process. Then, as with the above-described information reproducing method of the present invention, information is physically read by the reading process from the information recording medium. Then, the object data included in the read information is reproduced by the reproducing process on the basis of the reproduction control information and the reproduction sequence information included in this read information. Therefore, it is possible to multiplex and record various content information, such as at least one portion of the transport stream of the MPEG 2, including the still picture information, such as the bitmap and the JPEG, onto the above-described information recording medium of the present invention, and further it is possible to appropriately reproduce the multiplexed and recorded content information, including the still-picture-reproduction.

Incidentally, the information recording and reproducing method of the present invention can also take various aspects in response to various aspects of the above-described information recording medium of the present invention.

The above object of the present invention can be achieved by a computer program for controlling record which controls a computer provided in the above-described information recording apparatus of the present invention (including its various aspects) and which causes the computer to function as at least one portion of the first recording device, the second recording device, and the third recording device.

According to the computer program for controlling record of the present invention, the above described information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a computer program for controlling reproduction which controls a computer provided in the above-described information reproducing apparatus of the present invention (including its various aspects) and which causes the computer to function as at least one portion of the reproducing device.

According to the computer program for controlling reproduction of the present invention, the above described information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a computer program for controlling record and reproduction which controls a computer provided in the above-described information recording and reproducing apparatus of the present invention (including its various aspects) and which causes the computer to function as at least one portion of the first recording device, the second recording device, the third recording device, and the reproducing device.

According to the computer program for controlling record and reproduction of the present invention, the above described information recording and reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

The above object of the present invention can be achieved by a data structure including a control signal, in which a plurality of content information, which includes still picture information constituting a series of contents, is multiplexed-and-recorded by a unit of packet, which is a physically accessible unit, provided with: an object data file, which is a logically accessible unit, for storing object data which comprises a plurality of packets including packets each storing therein a piece of the content information; a reproduction sequence information file for storing reproduction sequence information which defines a reproduction sequence of the object data; and an object information file for storing, as reproduction control information for controlling reproduction of the object data, correspondence definition information for defining a correspondence relationship between the plurality of packets which are multiplexed and the plurality of content information, wherein the plurality of packets constituting the object data include packets, each packet storing therein a piece of respective one of still picture information sets each including at least one of the still picture information and still picture control information for controlling display of the still picture information and further including structural information for indicating a structure of the still picture information set, and with respect to at least one portion of the still picture information, a display control to the still picture information included in one still picture information set out of the still picture information sets is described by the still picture control information included in another still picture information set out of the still picture information sets.

According to the data structure including a control signal of the present invention, as in the case of the above-described information recording medium of the present invention, it is possible to multiplex and record the complicated content information including the still picture information, such as the bitmap and the JPEG, on the basis of the transport stream of the MPEG 2, and reproduce it including the still-picture-reproduction.

Incidentally, the data structure including a control signal of the present invention can also take various aspects in response to various aspects of the above-described information recording medium of the present invention.

The above object of the present invention can be also achieved by a first program storage device readable by a computer in an information recording apparatus for tangibly embodying a program of instructions executable by the computer to perform the above-described information recording method of the present invention.

The above object of the present invention can be also achieved by a second program storage device readable by a computer in an information reproducing apparatus for tangibly embodying a program of instructions executable by the computer to perform the above-described information reproducing method of the present invention.

The above object of the present invention can be also achieved by a third program storage device readable by a computer in an information recording and reproducing apparatus for tangibly embodying a program of instructions executable by the computer to perform the above-described information recording and reproducing method of the present invention.

According to the first, second, or third program storage device, such as a CD-ROM, a ROM, a DVD-ROM, and a hard disk, of the present invention, the above described information recording method, information reproducing method, or information recording and reproducing method of the present invention can be relatively easily realized as a computer reads and executes the program of instructions or as it executes the program after downloading the program through a communication device.

The above object of the present invention can be also achieved by a first computer data signal embodied in a carrier wave and representing a series of instructions which cause a computer in an information recording apparatus to perform the above-described information recording method of the present invention.

The above object of the present invention can be also achieved by a second computer data signal embodied in a carrier wave and representing a series of instructions which cause a computer in an information reproducing apparatus to perform the above-described information reproducing method of the present invention.

The above object of the present invention can be also achieved by a third computer data signal embodied in a carrier wave and representing a series of instructions which cause a computer in an information recording and reproducing apparatus to perform the above-described information recording and reproducing method of the present invention.

According to the first, second, or third computer data signal embodied in the carrier wave of the present invention, as the computer downloads the program in the computer data signal through a computer network or the like, and executes this program, it is possible to relatively easily realize the above described information recording method, information reproducing method, or information recording and reproducing method of the present invention.

These functions and other advantages of the present invention will be apparent from the following description of embodiments.

BRIEF DESCRIPTION OF DRAWINGS

FIG. 1 is a diagram showing a basic structure of an optical disc as being one embodiment of an information recording medium of the present invention, the upper part being a schematic plan view of the optical disc having a plurality of areas, the corresponding bottom part being an schematic diagram of the area structure in the radial direction;

FIG. 14 is a conceptual diagram showing one example of the data structure of ES address information associated with a video stream constructed in an ES map table in object information in the embodiment;

FIG. 15 is a conceptual diagram schematically showing one example of the positions of TS packets registered in the ES address information of the video stream on a TS object with respect to a time axis;

FIG. 16 is a conceptual diagram showing the contents of SP data, SP control information, and structural information, associated with a first obtaining method of obtaining the SP data and the SP control information in the embodiment;

FIG. 17 are schematic diagrams showing sub picture structures associated with the embodiment;

FIG. 20 is a conceptual diagram showing the data structure of ES address information associated with a sub picture stream in the TS object shown in FIG. 19;

FIG. 21 is a conceptual diagram showing the contents of the SP data, the SP control information, and the structural information, associated with a second obtaining method of obtaining the SP data and the SP control information in the embodiment;

FIG. 22 is a conceptual diagram showing an obtaining procedure in the second obtaining method;

FIG. 23 is a conceptual diagram showing the data structure of the ES address information associated with the sub picture stream in the TS object shown in FIG. 22;

FIG. 24 is a conceptual diagram showing a specific example of the structural information and the SP control information, associated with the second obtaining method;

FIG. 31 is a schematic diagram showing one specific example of the data structure of a disc information file in one specific example of the embodiment;

FIG. 32 is a schematic diagram showing one specific example of the data structure of a title information table included in the disc information file in one specific example of the embodiment;

FIG. 34 is a schematic diagram showing one specific example of the data structures of an AU table constructed in an object information file and an ES map table related to the AU table in one specific example of the embodiment.

Figure 2A:
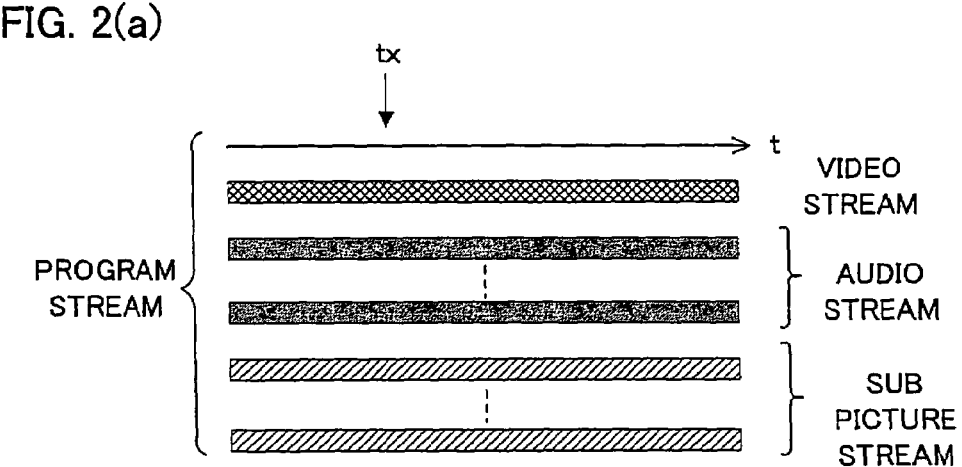
FIGS. 2 are a schematic diagram of the conventional program stream of the MPEG 2 (FIG. 2(a)) and a schematic diagram of the transport stream of the MPEG 2 used in the embodiment (FIG. 2(b))

BEST MODE FOR CARRYING OUT THE INVENTION (Information Recording Medium)

The embodiment of an information recording medium of the present invention will be explained with reference to FIG. 1 to FIG. 7. In this embodiment, the information recording medium of the present invention is applied to an optical disc of a type capable of recording (writing) and reproducing (reading).

Firstly, the basic structure of the optical disc in the embodiment will be explained with reference to FIG. 1. The upper part of FIG. 1 is a schematic plan view of the optical disc structure having a plurality of areas, and the bottom part is a schematic diagram of the area structure in its radial direction As shown in FIG. 1, an optical disc 100 is recordable in various recoding methods, such as a magnet-optical method and a phase transition method, onto which it is possible to record (write) information a plurality of times or only once. It is provided with a lead-in area 104, a data record area 106, and a lead-out area 108 on a recording surface on the disc main body, which is about 12 cm in diameter, as is the DVD, with a center hole 102 as the center, in the direction from the inner circumference to the outer circumference. In each area, groove tracks and land tracks are alternately placed spirally or coaxially with the center hole 102 as the center, for example. These groove tracks may be wobbled, and pre-pits may be formed on either or both of the tracks. Incidentally, the present invention is not specially limited to an optical disc having these three areas.

Figure 2B:
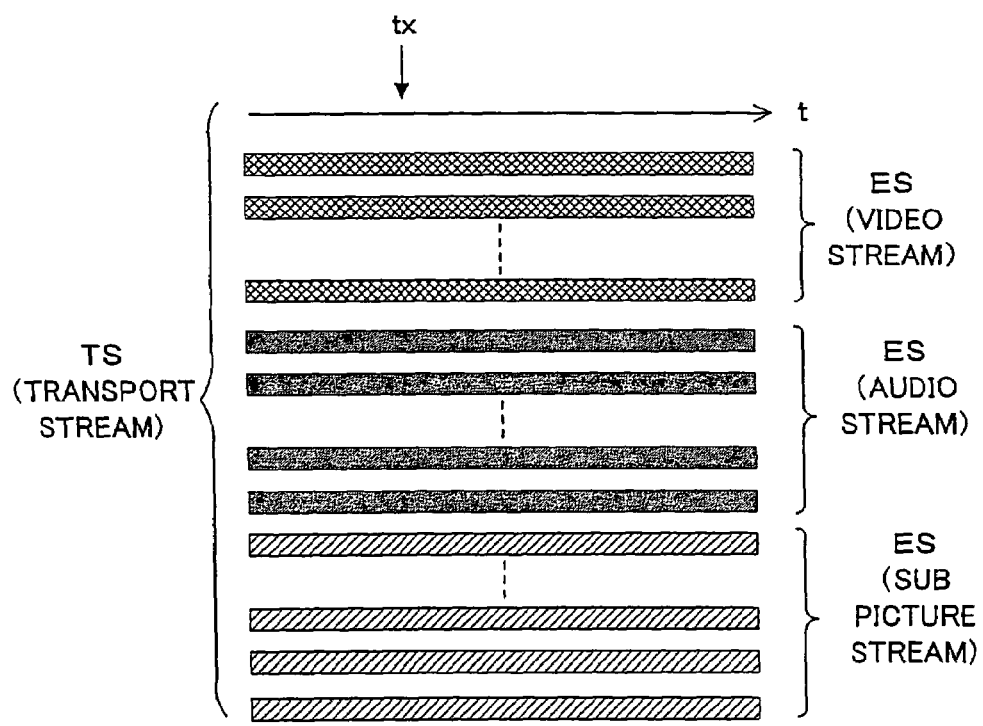

Secondly, the structure of a transport stream (TS) recorded on the optical disc of the present invention will be explained with reference to FIGS. 2. FIG. 2(a) schematically shows the structure of a conventional program stream of the MPEG 2 in the conventional DVD, as a comparison. FIG. 2(b) schematically shows the structure of the transport stream (TS) of the MPEG 2.

In FIG. 2(a), one program stream includes (i) only one video stream for video data as being the video information, and further (ii) at most 8 audio streams for audio data as being the audio information, and also (iii) at most 32 sub picture streams for sub picture data as being the sub picture information, along a time axis t. Namely, the video data multiplexed at an arbitrary time point tx is related to only the one video stream. For example, a plurality of video streams corresponding to a plurality of TV shows or movies cannot be included in the program stream at the same time. In order to multiplex the TV show and the like accompanying pictures and transmit or record them, at least one video stream is required for each TV show and the like, so that the program stream format in which only one video stream exists cannot allow the plurality of TV shows and the like to be transmitted or recorded after multiplexing them.

In FIG. 2(b), one transport stream (TS) includes (i) a plurality of video streams, as an elementary stream (ES) for the video data as being the video information, and further (ii) a plurality of audio streams, as an elementary stream (ES) for the audio data as being the audio information, and also (iii) a plurality of sub picture streams, as an elementary stream (ES) for the sub picture data as being the sub picture information. Namely, the video data multiplexed at an arbitrary time point tx is related to the plurality of video streams. For example, the plurality of video streams corresponding to a plurality of TV shows or movies can be included in the transport stream at the same time. As described above, the transport stream format in which there are the plurality of video streams can allow the plurality of TV shows and the like to be transmitted or recorded after multiplexing them. However, digital broadcasting that employs an existing transport stream does not transmit the sub picture stream.

Incidentally, in FIG. 2(a) and FIG. 2(b), the video stream, the audio stream, and the sub picture stream are arranged in this order from up to down for explanatory convenience; however, this order is not intended to correspond to an order of multiplexing them by a unit of packet, as described later, or the like. In the transport stream, one combination, which is one video stream, two audio streams, and two sub picture streams, conceptually corresponds to one show, for example.

The optical disc 100 in the embodiment described above is constructed to multiplex-and-record onto it the transport stream (TS) including a plurality of elementary streams (ES) in the above manner, to simultaneously record onto it the plurality of shows or programs.

Figure 3:
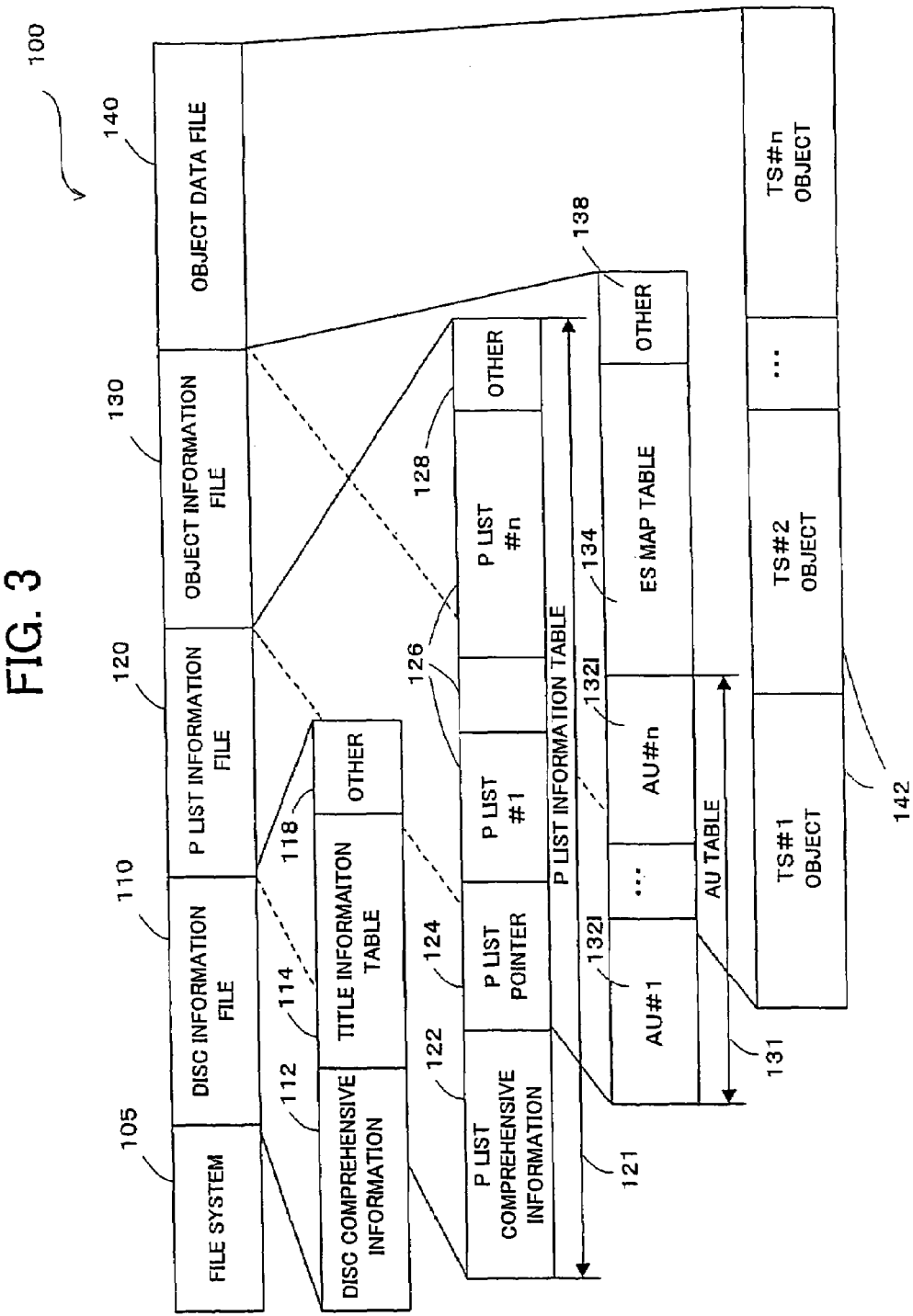
FIG. 3 is a schematic diagram showing a data structure recorded on the optical disc in the embodiment.
Figure 4:
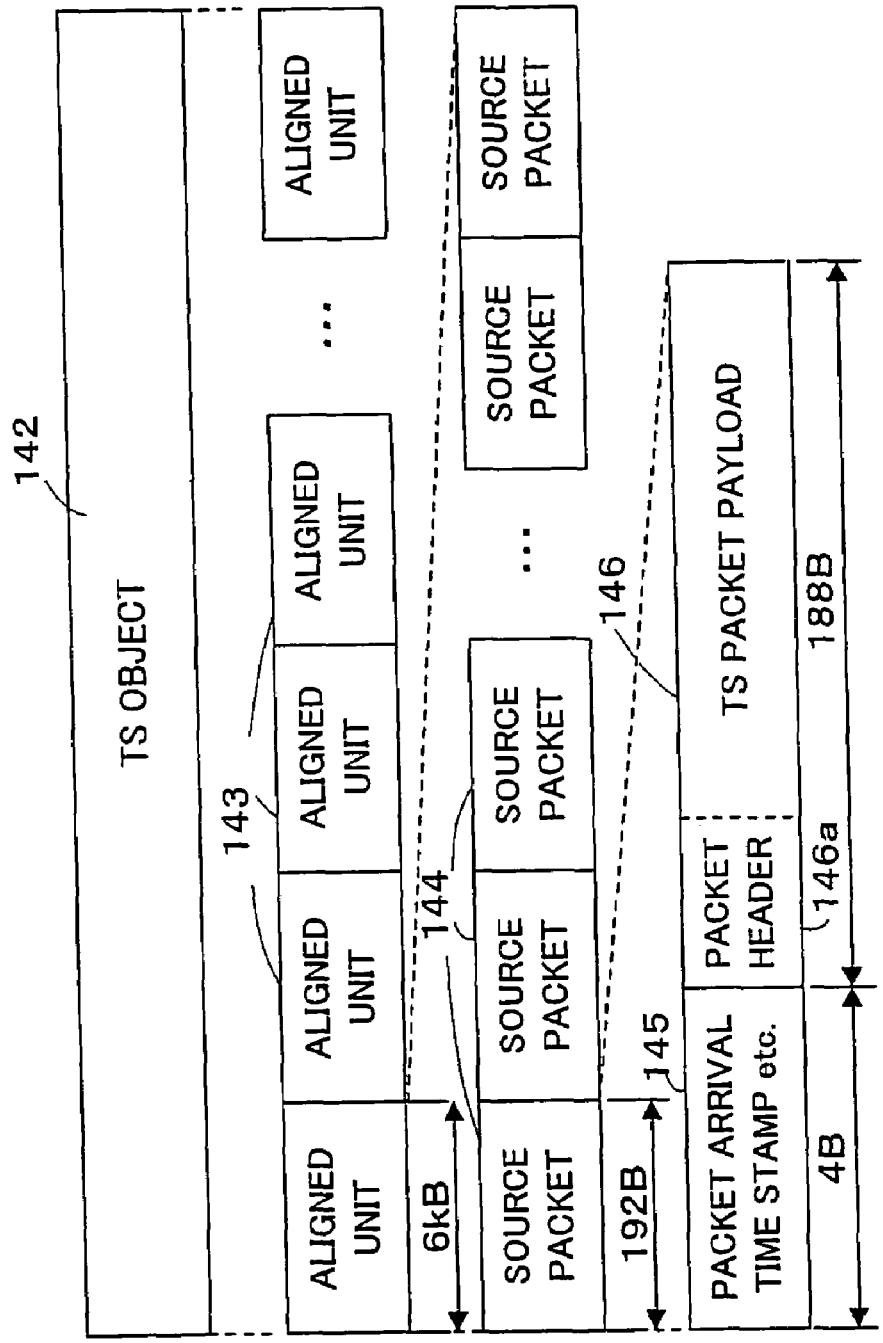
FIG. 4 is a schematic diagram showing details of the data structure in each object shown in FIG. 3.

Next, a data structure recorded on the optical disc 100 will be explained with reference to FIG. 3 and FIG. 4. FIG. 3 schematically shows the data structure recorded on the optical disc 100. FIG. 4 schematically shows details of the data structure in each object shown in FIG. 3.

In the explanation below, a "title" is a reproduction unit sequentially executing a plurality of "play lists", and is a logically large grouped unit, such as one movie and one TV show. The "play list" is a file for storing information necessary for the reproduction of an "object", and is provided with a plurality of "Items", each of which stores information about the reproduction range of the object to access the object. More specifically, "IN point information" indicating a start address of the object and "OUT point information" indicating an end address of the object are written in each Item. Incidentally, these "IN point information" and "OUT point information" may show the addresses directly, or show the addresses indirectly by showing a time length or a time point on a reproduction time axis. The "object" is the entity information of a content constituting the transport stream of the MPEG 2 described above.

In FIG. 3, the optical disc 100 is provided with the following four files as a logical structure: a disc information file 110, a play (P) list information file 120, an object information file 130, and an object data file 140. It is further provided with a file system 105 to manage those files. Incidentally, FIG. 3 does not directly show the physical data alignment on the optical disc 100, but it is possible to record with the arrangement order shown in FIG. 3 corresponding to the arrangement order shown in FIG. 1. Namely, it is possible to record the file system 105 or the like in the lead-in area 104, and then in the data record area 106, and further it is also possible to record the object data file 140 or the like in the data record area 106. Even if the lead-in area 104 and/or the lead-out area 108 shown in FIG. 1 do no exist, the file structure shown in FIG. 3 can be constructed.

The disc information file 110 is a file for storing comprehensive information about the whole optical disc 100, and it stores disc comprehensive information 112, a title information table 114, and other information 118. The disc comprehensive information 112 stores the total number of titles and the like in the optical disc 100, for example. The title information table 114 stores, for each title, each title type (e.g. a sequential reproduction type, a branch type, and the like) and a play (P) list number, which constitutes each title, as logical information.

The play list information file 120 stores a play (P) list information table 121, which indicates the logical construction of each play list, and this is separated into play (P) list comprehensive information 122, a play (P) list pointer 124, a plurality of play (P) lists 126 (P lists #1 to #n), and other information 128. This play list information table 121 stores the logical information of each play list 126 in the order of the play list number. In other words, the storing order of each play list 126 is the play list number. Moreover, it is also possible to refer to the same play list 126 from a plurality of titles at the above described title information table 114. Namely, even in the case where a title #n and a title #m use the same play list #p, it is possible to construct such that the play list #p in the play list information table 121 is pointed at the title information table 114.

The object information file 130 stores various attribute information about the storing position in the object data file 140 for each Item constituted in each play list 126 (i.e. a logical address that is a reproduction object) and about the reproduction of the Item. Especially, in this embodiment, the object information file 130 stores an AU (Associate Unit) table 131 including a plurality of AU information 132I (AU #1 to AU #n), as described later in detail, an ES (Elementary Stream) map table 134, and other information 138.

The object data file 140 stores a plurality of TS objects 142 (TS #1 object to TS #n object) for each transport streams (TS). Namely, it stores a plurality of entity data of the contents to be actually reproduced.

Incidentally, the four files explained with reference to FIG. 3 may be stored with each of them being separated into a plurality of files, and all of them may be managed or administered by the file system 105. For example, the object data file 140 can be separated into a plurality of data files, such as an object data file #1, an object data file #2, . . . and the like.

As shown in FIG. 4, the TS object 142 shown in FIG. 3, which is a logically reproducible unit, is divided into a plurality of aligned units 143, each of which has 6 kB data amount, for example. The head of the aligned units 143 corresponds to (or is "aligned" with) the head of the TS object 142. Each aligned unit 143 is further segmentized into a plurality of source packets 144, each of which has 192 B data amount. The source packet 144 is a physically reproducible unit, and by using this unit, i.e. by a unit of packet, at least the video data, the audio data, and the sub picture data are multiplexed among the data on the optical disc 100. The other information may be also multiplexed in this manner. Each source packet 144 includes: control information 145, which has 4 B data amount, for controlling the reproduction, such as a packet arrival time stamp indicating a reproduction start time point of the TS (transport stream) packet on a reproduction time axis etc.; and a TS packet 146, which has 188B data amount. The TS packet 146 has a packet header 146a at the head portion thereof and has a packet payload as a substantial data or entity data following the packet header 146a. The video data is packetized to be a "video packet", the audio data is packetized to be an "audio packet", the sub picture data is packetized to be a "sub picture packet", or the other data is packetized.

Figure 5:
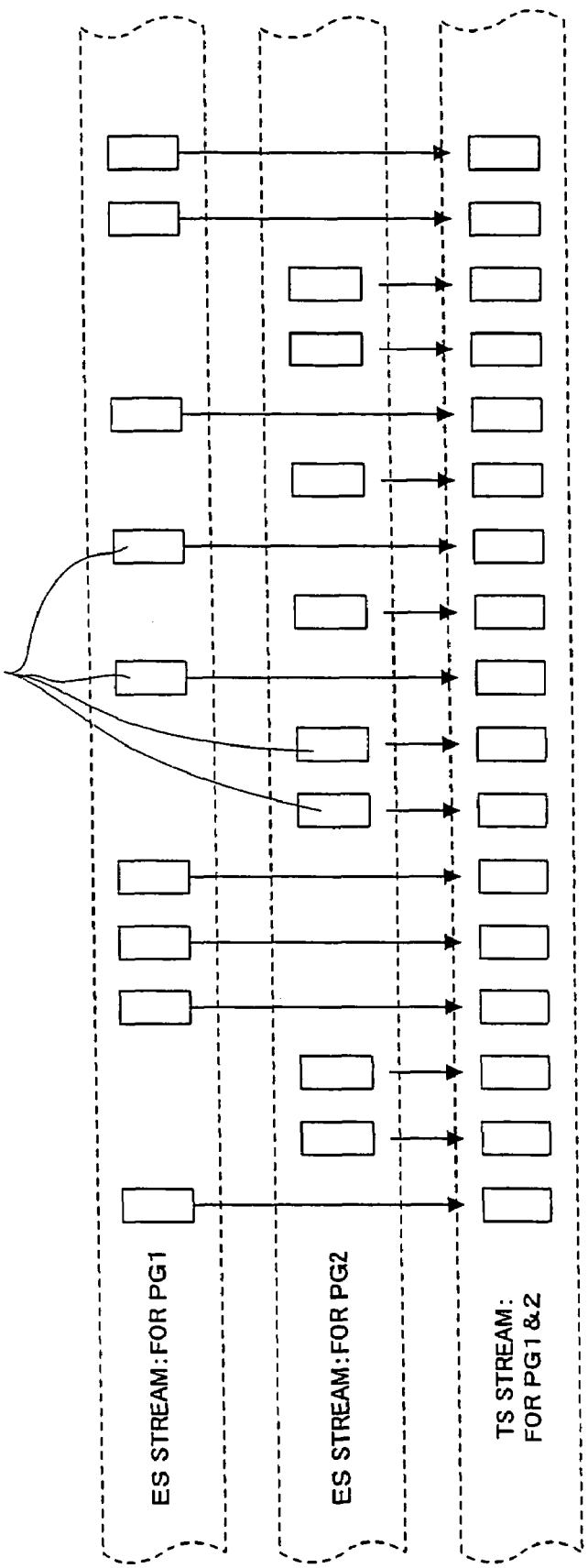
FIG. 5 is a schematic diagram showing that an elementary stream for a program #1 at an upper level and an elementary stream for a program #2 at a middle level are multiplexed, constituting a transport stream for these two programs at a low level, with the horizontal axis as a time axis.
Figure 6:
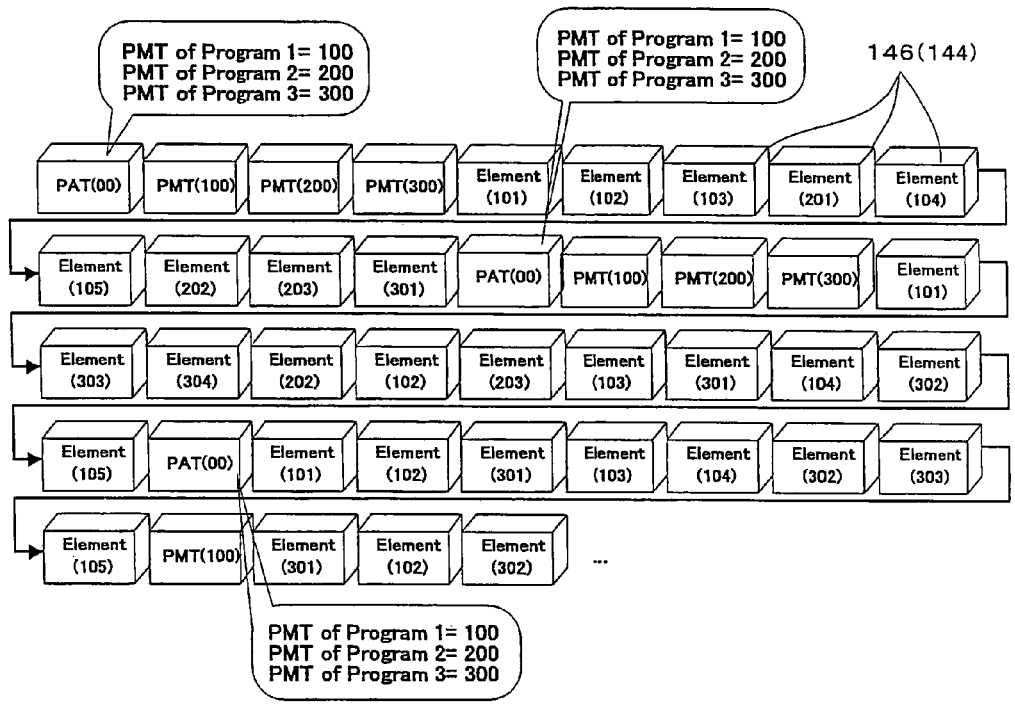
FIG. 6 is a schematic diagram showing the image of TS packets multiplexed in one transport stream as a packet alignment along time.

Next, with reference to FIG. 5 and FIG. 6, it will be explained the multiple record of the video data, the audio data, the sub picture data, and the like, which are in the transport stream format as shown in FIG. 2(b), on the optical disc 100 by the TS packet 146 shown in FIG. 4. FIG. 5 schematically shows that an elementary stream (ES) for a program #1 (PG 1) at the upper level in the figure and an elementary stream (ES) for a program #2 (PG 2) at the middle level in the figure are multiplexed, constituting a transport stream (TS) for these two programs (PG 1 & PG 2) at the lower level in the figure, with the horizontal axis as a time axis. FIG. 6 schematically shows the image of TS packets multiplexed in one transport stream (TS) as a packet alignment along time.

As shown in FIG. 5, the TS packets 146 with the video data for the program #1 packetized are discretely arranged with respect to the time axis in the elementary stream for the program #1 (the upper one), for example. The TS packets 146 with the video data for the program #2 packetized are discretely arranged with respect to the time axis in the elementary stream for the program #2 (the middle one), for example. Then, these TS packets 146 are multiplexed, constructing the transport stream (the lower one) for those two programs. Incidentally, this is omitted in FIG. 5 for explanatory convenience, but in fact, the elementary stream provided with the TS packets in which the audio data is packetized and the sub picture stream provided with the TS packets in which the sub picture data is packetized may be multiplexed as the elementary stream for the program #1 in the same manner as shown in FIG. 2(b). Moreover, in addition to these, the elementary stream provided with the TS packets in which the audio data is packetized and the sub picture stream provided with the TS packets in which the sub picture data is packetized may be multiplexed as the elementary stream for the program #2 in the same manner.

As shown in FIG. 6, in this embodiment, one TS stream is constructed of many TS packets 146 multiplexed as described above. Then, the many TS packets 146 in this multiplexed form obtain the information 145 such as the packet arrival time stamp and are multiplexed-and-recorded on the optical disc 100. Incidentally, "Element (i0j)" is used in FIG. 6 for the TS packet 146 comprising data which constitutes the program #i (i=1, 2, 3), with j (j=1, 2, . . . ) as a number indicating the order for each stream which constitutes the program. This (i0j) is a packet ID, which is the identification number of the TS packet 146 for each elementary stream. A specific value is given to this packet ID between the plurality of TS packets 146 multiplexed at the same time point so that the plurality of TS packets 146 can be mutually distinguished even if they are multiplexed at the same time point.

In FIG. 6, a PAT (Program Associate Table) and a PMT (Program Map Table) are also packetized by a unit of the TS packet 146 and are multiplexed. Among them, the PAT stores a table indicating a plurality of PMT packet IDs. Especially, with regard to the PAT, the MPEG 2 standard defines the addition of (000), as shown in FIG. 6, as a predetermined packet ID. Namely, it is constructed such that the TS packet 146 in which the PAT is packetized is detected as the TS packet 146 with its packet ID (000) from among many packets multiplexed at the same time point. The PMT stores a table indicating the packet ID for each elementary stream constituting each program with respect to one or a plurality of programs. To the PMT, an arbitrary packet ID may be added, but the packet ID of the PMT is indicated by the PAT detectable having the packet ID as (000), as described above. Therefore, the TS packets 146 in each of which the PMT is packetized (i.e. the TS packets 146 with the packet IDs (100), (200), and (300) added in FIG. 6) are detected by virtue of the PAT from among many packets multiplexed at the same time point.

In the case where the transport stream is digital-transmitted as shown in FIG. 6, the tuner can pick up the packets corresponding to the desired elementary stream from among the multiplexed packets by referring to the PAT and the PMT as constructed above, and demodulate them.

In this embodiment, the TS packet 146 stored in the TS object 142 shown in FIG. 4 includes these PAT and PMT packets. Namely, when the transport stream shown in FIG. 6 is transmitted, it can be recorded onto the optical disc 100 as it is, which is a great advantage.

Moreover, in this embodiment, the PAT and PMT as recorded above are not referred to when reproducing the optical disc 100. Instead, referring to the AU table 131 and the ES map table 134, as shown in FIG. 3 and as described later in detail, allows more effective reproduction, and also enables complicate multi-vision reproduction and the like to be treated with. On that account, in this embodiment, the corresponding relationship between the elementary stream and the packet, which are obtained by referring to the PAT and the PMT when demodulating and recording, is stored in the object information file 130 in the form of the AU table 131 and the ES map table 134 without packetizing nor multiplexing.

Figure 7:
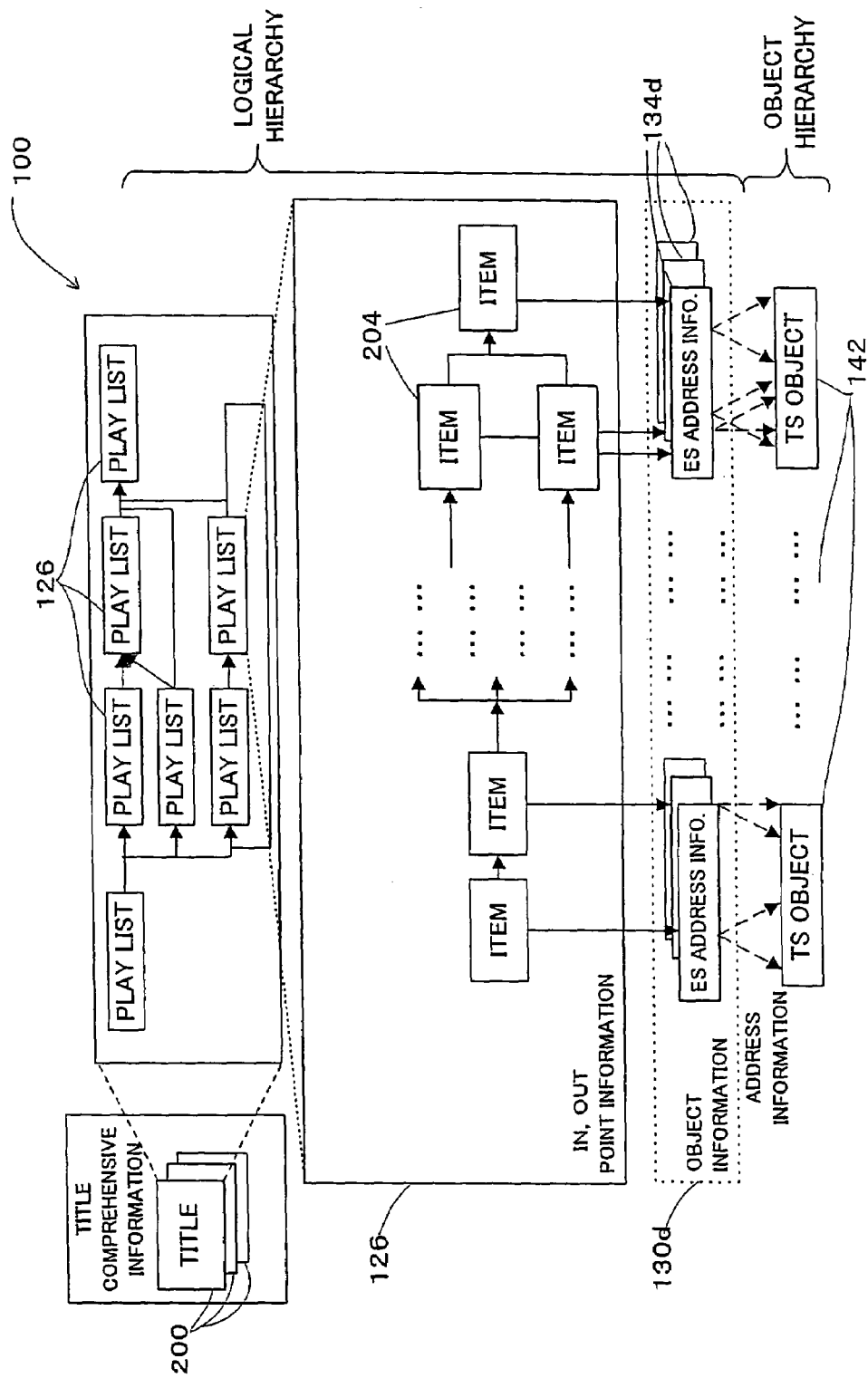
FIG. 7 is a schematic diagram showing the logical construction of data on the optical disc in the embodiment, focusing on the development of a logical hierarchy to an object hierarchy or an entity hierarchy.

Next, the logical construction of the data on the optical disc 100 will be explained with reference to FIG. 7. FIG. 7 schematically shows the logical construction of the data on the optical disc 100, focusing on the development of a logical hierarchy to an object hierarchy or an entity hierarchy.

In FIG. 7, the optical disc 100 records one or a plurality of titles 200, each of which is a logically large unit, such as one movie or one TV show. Each title 200 is logically constructed of one or a plurality of play lists 126. In each title 200, the plurality of play lists 126 may have a sequential structure or a branch structure.

Incidentally, in the case of a simple logical construction, one title 200 is constructed of one play list 126. Moreover, one play list 126 can be referred to from the plurality of titles 200.

Each play list 126 is logically constructed of a plurality of Items (i.e., the play items) 204. In each play list 126, the plurality of Items 204 may have the sequential structure or the branch structure. Moreover, one Item 204 can be referred to from the plurality of play lists 126. The reproduction range of the TS object 142 is logically specified by the above described IN point information and OUT point information written in the Item 204. Then, by referring to object information 130*d* with respect to the reproduction range logically specified, the reproduction range of the TS object 142 is physically specified via the file system in the end. Here, the object information 130*d* includes various information to reproduce the TS object 142, such as the attribute information of the TS object 142 and ES address information 134*d* required for a data search in the TS object 142 (incidentally, the ES map table 134 shown in FIG. 3 includes a plurality of such ES address information 134*d*).

When reproducing the TS object 142 by an information recording/reproducing apparatus, which will be described later, a physical address to be reproduced in the TS object 142 is obtained from the Item 204 and the object information 130*d*, and the desired elementary stream is reproduced.

In this embodiment, as described above, the association from the logical hierarchy to the object hierarchy of the reproduction sequence is made by the IN point information and the OUT point information described in the Item 204 and by the ES address information 134*d* described in the ES map table 134 (refer to FIG. 3) of the object information 130*d*, which enables the elementary stream to be reproduced.

As described above in detail, in the embodiment, the multiplexing and recording is performed on the optical disc 100 by a unit of the TS packet 146, and because of this, it is possible to multiplex-and-record onto the optical disc 100 the transport stream including many elementary streams as shown in FIG. 2(*b*). According to this embodiment, in the case of recording digital broadcasting onto the optical disc 100, a plurality of shows or programs can be recorded at the same time within the limit of the record rate. Here, it employs a method of multiplexing the plurality of shows or programs and recording them into one TS object 142. The embodiment of an information recording/reproducing apparatus executable this kind of record processing will be explained hereinafter.

(Information Recording/Reproducing Apparatus)

Figure 8:
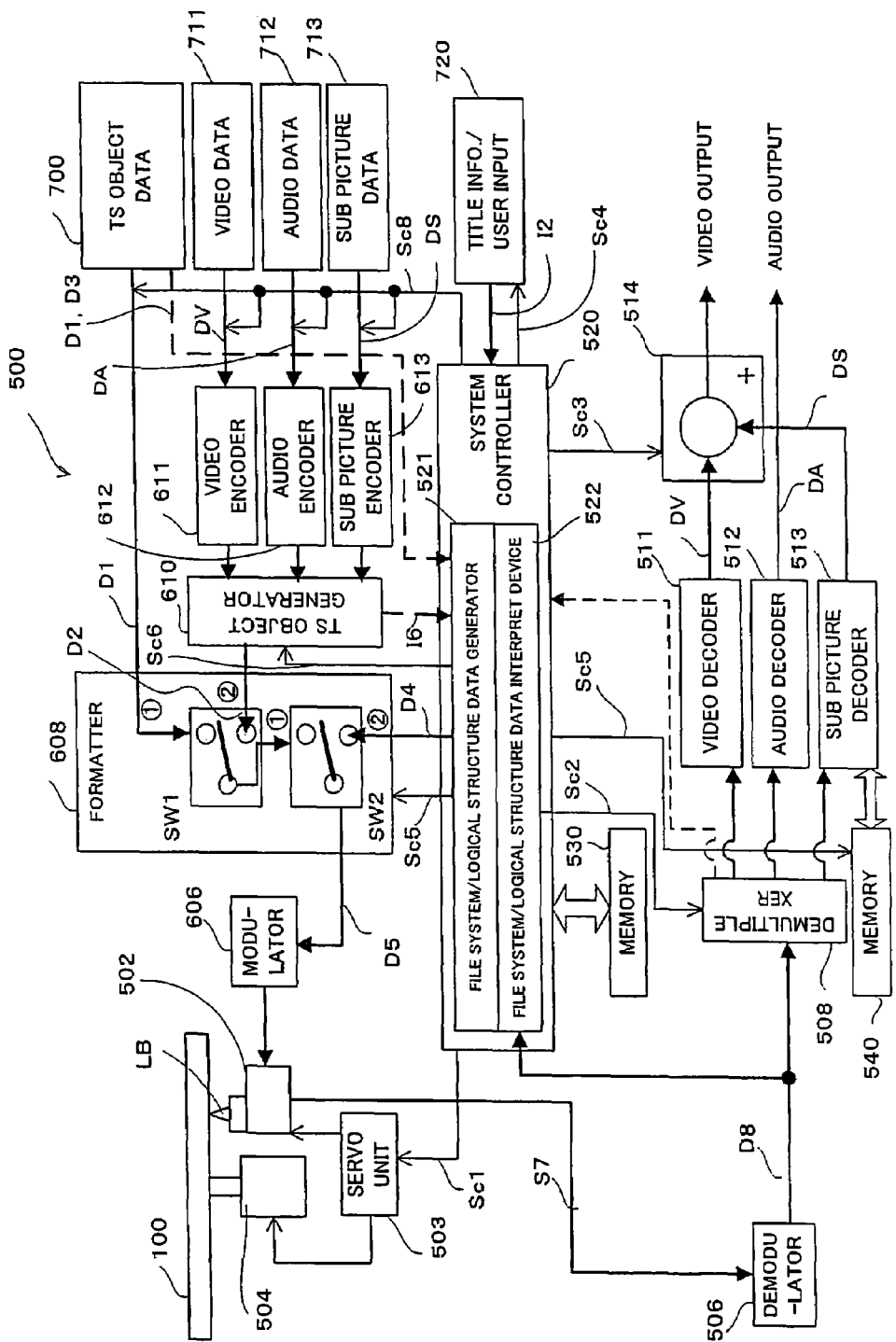
FIG. 8 is a block diagram showing an information recording/reproducing apparatus related to the embodiment of the present invention.

Next, the embodiment of the information recording/reproducing apparatus of the present invention will be explained with reference to FIG. 8 to FIG. 13. FIG. 8 is a block diagram of the information recording/reproducing apparatus, and FIG. 9 to FIG. 13 are flow charts showing its operation.

In FIG. 8, an information recording/reproducing apparatus 500 is classified broadly into a reproduction system and a record system, can record information onto the optical disc 100 described above, and can reproduce the information recorded on this. In this embodiment, the information recording/reproducing apparatus 500 is for recording and reproducing as described above, but it is possible to construct an embodiment of the recording apparatus of the present invention from the record system part of the information recording/reproducing apparatus 500. On the other hand, it is possible to construct an embodiment of the reproducing apparatus of the present invention from the reproduction system part of the information recording/reproducing apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; a sub picture decoder 513; an adder 514; a system controller 520; a memory 530; a memory 540; a modulator 606; a formatter 608; a TS object generator 610; a video encoder 611; an audio encoder 612; and a sub picture encoder 613. The system controller 520 is provided with a file system/logical structure data generator 521; and a file system/logical structure data interpret device 522. Moreover, the memory 530 and a user interface 720 for the user input of the title information and the like are connected to the system controller 520.

Among these constitutional elements, the demodulator 506, the demultiplexer 508, the video decoder 511, the audio decoder 512, the sub picture decoder 513, the adder 514, and the memory 540 constitute the reproduction system, mostly. On the other hand, among these constitutional elements, the modulator 606, the formatter 608, the TS object generator 610, the video encoder 611, the audio encoder 612, and the sub picture encoder 613 constitute the record system, mostly. The optical pickup 502, the servo unit 503, the spindle motor 504, the system controller 520, the memory 530, and the user interface 720 for the user input of the title information and the like are shared for both the reproduction system and the record system, mostly. Moreover, a TS object data source 700, a video data source 711, an audio data source 712, and a sub picture source 713 are prepared for the record system. The file system/logical structure data generator 521 installed in the system controller 520 is mainly used in the record system, and the file system/logical structure data interpret device 522 is mainly used in the reproduction system.

The optical pickup 502 irradiates a light beam LB, such as a laser beam, onto the optical disc 100 with a first power as a reading light when reproducing, and with a second power as a writing light when recording while modulating it. The servo unit 503 is controlled by a control signal Sc1 outputted from the system controller 520 when reproducing and recording, and it performs a focus servo, a tracking servo, and the like at the optical pickup 502, as well as performing a spindle servo at the spindle motor 504. The spindle motor 504 is constructed to spin the optical disc 100 at a predetermined speed while receiving the spindle servo by the servo unit 503.

(i) Structure and Operation in Record System

Next, the specific structure and operation of each constitutional element constituting the record system in the information recording/reproducing apparatus 500 will be explained case by case, with reference to FIG. 8 to FIG. 12.

(i-1) The Case of Using the Already Prepared TS Object:

This case will be explained with reference to FIG. 8 and FIG. 9.

In FIG. 8, the TS object data source 700 is provided with a record storage, such as a video tape and a memory, and it stores TS object data D1.

Figure 9:
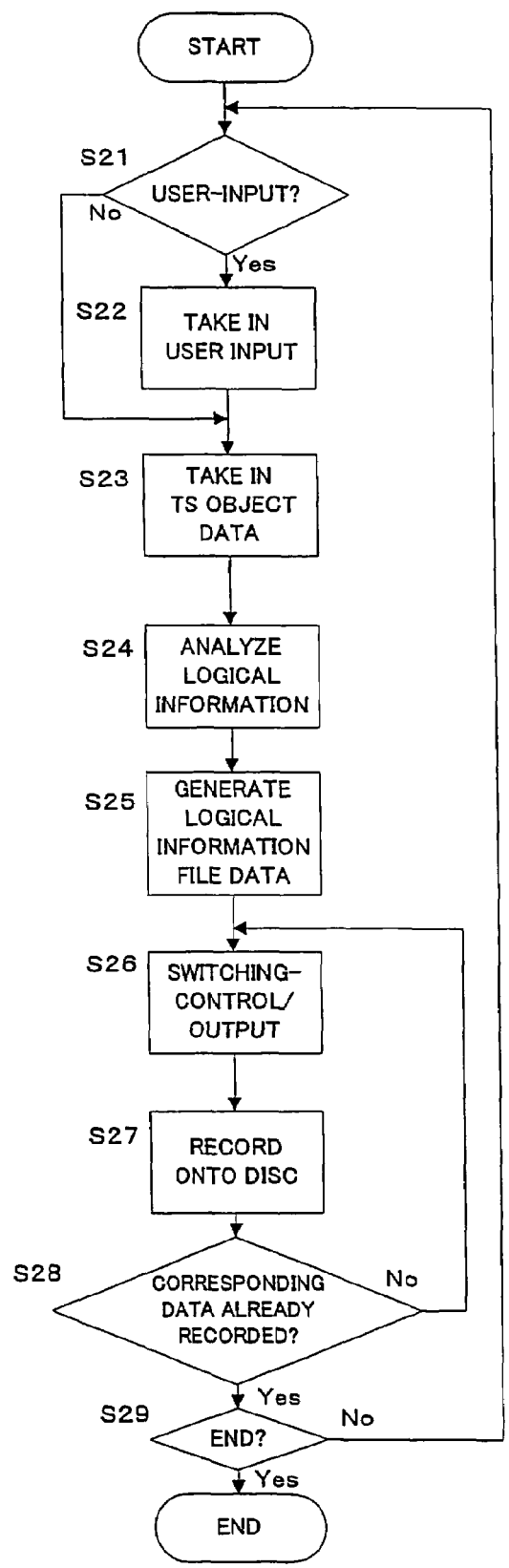
FIG. 9 is a flow chart showing a record operation (part 1) of the information recording/reproducing apparatus in the embodiment.

In FIG. 9, firstly, the information about each title (e.g. the structure content of a program list and the like) logically constructed on the optical disc 100 using the TS object data D1 is inputted from the user interface 720 to the system controller 520, as a user input I2 of the title information and the like. Then, the system controller 520 takes in the user input I2 of the title information and the like obtained from the user interface 720 (step S21: Yes and step S22). In this case, the user interface 720 is controlled by a control signal Sc4 from the system controller 520, and it can perform input processing according to the content to be recorded, such as choosing through a title menu screen. Incidentally, in the case where the user input has been already performed or the like (step S21: No), this processing is omitted.

Then, the TS object data source 700 is controlled by a control signal Sc8 giving an instruction for reading out the data from the system controller 520, and outputs the TS object data D1. Then, the system controller 520 takes in the TS object data D1 from the TS object source 700 (step S23), and performs the analysis of the data array of the TS object data D1 (e.g. a record data length and the like), the analysis of each elementary stream structure (e.g. understanding of ES_PID (Elementary Stream•Packet Identification number) as described later), and the like, by virtue of a TS analysis function of the file system/logical structure data generator 521, for example, on the basis of the PAT, the PMT, and the like packetized as well as the video data and the like as described above (step S24).

Then, the system controller 520 prepares the disc information file 110, the play list information file 120, the object information file 130, and the file system 105 (refer to FIG. 3), as logical information file data D4, by virtue of the file system/logical structure data generator 521, from the user input I2 of the taken-in title information and the like and from the analysis results of the data array of the TS object data D1 and each elementary stream (step S25). The memory 530 is used when preparing the logical information file data D4 described above.

Incidentally, such a variation that the data about the data array of the TS object data D1, the data about the construction information of each elementary stream, and the like are prepared in advance, is apparently and variously conceivable. Such a variation is also within the scope of the embodiment.

In FIG. 8, the formatter 608 is a device for performing a data array format to store onto the optical disc 100 the TS object data D1 and the logical information file data D4. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as output the logical information file data D4.

In a step S26 in FIG. 9, (i) the logical information file data D4 from the file system/logical structure data generator 521 in the step S25 or (ii) the TS object data D1 from the TS object data source 700 is outputted through the formatter 608 by the switching-control by the formatter 608 as constructed above (step S26).

The selection output from the formatter 608 is transmitted to the modulator 606 as disc image data D5, is modulated by the modulator 606, and is recorded onto the optical disc 100 through the optical pickup 502 (step S27). The system controller 520 also executes the disc record control in this case.

Then, if both the logical information file data D4 generated in the step S25 and the corresponding TS object data D2 have not been completely recorded yet, the operational flow returns to the step S26, continuing to the record (step S28: No). Incidentally, there is no preference in the record order of the logical information file data D4 and the corresponding TS object data D2.

On the other hand, if the both have been already recorded, it is judged whether or not the record on the optical disc 100 is supposed to be ended, on the basis of the presence or absence of an end command (step S29). If not supposed to be ended (step S29: No), the operational flow returns to the step S21, continuing the record processing. On the other hand, if supposed to be ended (step S29: Yes), a series of record processing ends.

As described above, the information recording/reproducing apparatus 500 performs the record processing in the case of using the already prepared TS object.

Incidentally, the example in FIG. 9 shows that the logical information file data D4 and the corresponding TS object data D2 are outputted in the step S26, after preparing the logical information file data D4 in the step S25. However, it is also possible to execute the output of the TS object data D2 and/or the record of the TS object data D2 onto the optical disc 100 before the step S25, and after or in parallel with this recording, it is possible to generate and record the logical information file data D4.

(i-2) The Case of Receiving and Recording the Transport Stream on Air

Figure 10:
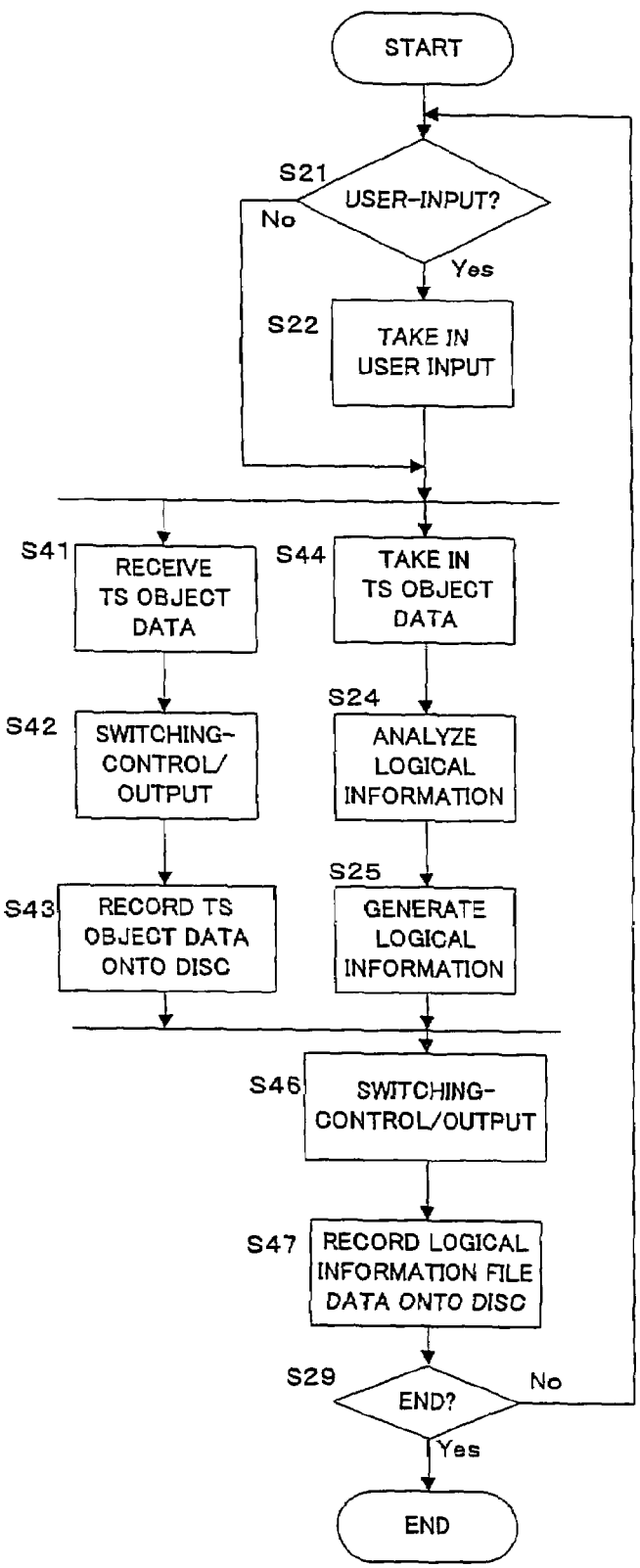
FIG. 10 is a flow chart showing a record operation (part 2) of the information recording/reproducing apparatus in the embodiment.

This case will be explained with reference to FIG. 8 and FIG. 10. Incidentally, in FIG. 10, the same steps as those in FIG. 9 have the same step reference numbers, and their explanation will be omitted as occasion demands.

Again, in this case, the similar processing is performed, as is "the case of using the already prepared TS object" described above. Therefore, focusing on the differences from this case, the explanation will be done hereinafter.

In the case of receiving and recording the transport stream on air, or the transport stream being broadcasted, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the ES_PID information, as described later, which are deciphered upon receiving is taken into the system controller 520 and is stored into the memory 530 (step S44).

In the meantime, the TS object data D1 outputted to the formatter 608 is outputted to the modulator 606 by the switching-control of the formatter 608 (step S42), and is recorded onto the optical disc 100 (step S43).

Along with these operations, using the program construction information and the ES_PID information included in the reception information D3 taken-in upon receiving and stored in the memory 530, the file system/logical structure data generator 521 prepares the logical information file data D4 (step S24 and step S25). Then, after completing the record of a series of the TS object data D1, this logical information file data D4 is additionally recorded onto the optical disc 100 (step S46 and step S47). Incidentally, these step S24 and step S25 may be performed after the step S43.

Moreover, as the occasion demands (e.g. in the case of editing one portion of the title, or the like), by adding the user input 12 of the title information and the like from the user interface 720 to the program construction information and the ES_PID information stored in the memory 530, it is possible to prepare the logical information file data D4 by the system controller 520 and additionally record this onto the optical disc 100.

As described above, the information recording/reproducing apparatus 500 performs the record processing in the case of receiving the transport stream on air and recording it in real time.

Incidentally, if all the reception data obtained when broadcasting is once stored into an archive apparatus, and then, if this is used as the TS object source 700, the same processing as that in "the case of using the already prepared TS object" will do.

Figure 11:
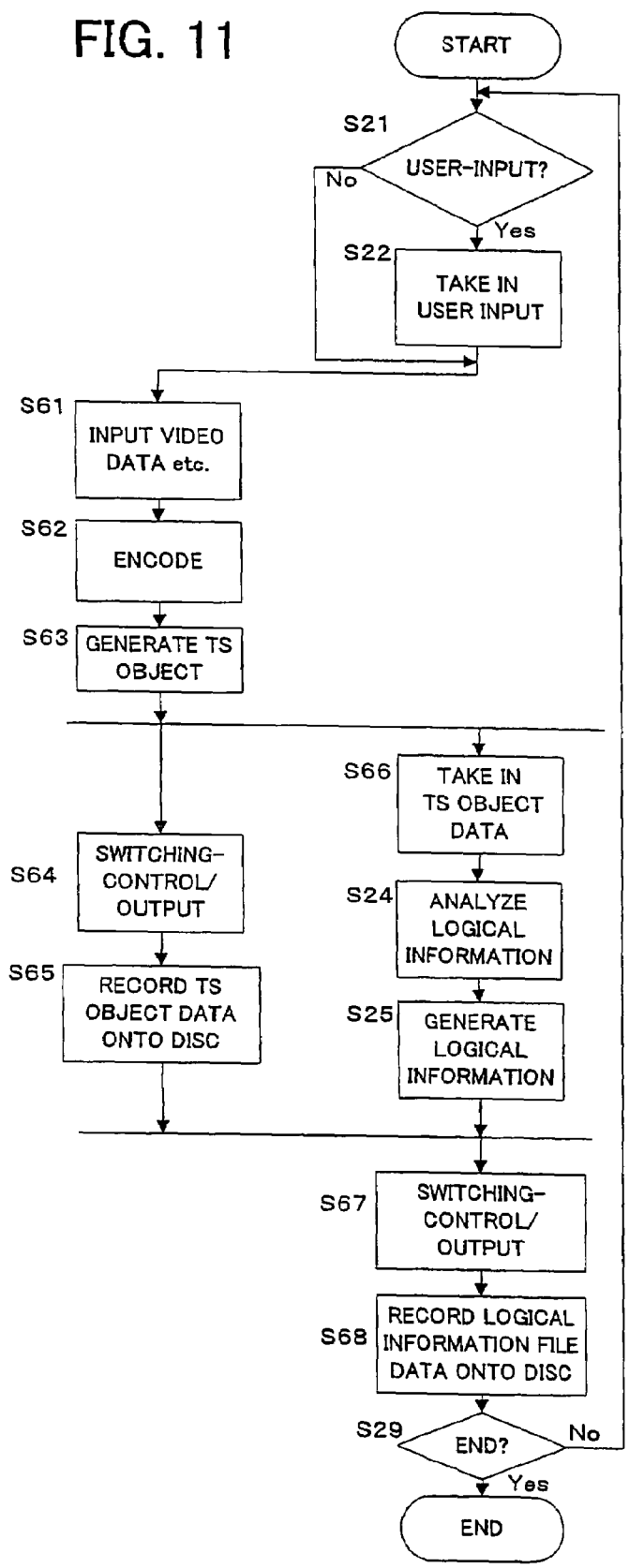
FIG. 11 is a flow chart showing a record operation (part 3) of the information recording/reproducing apparatus in the embodiment.

(i-3) The Case of Recording the Video Data, the Audio Data, and the Sub Picture Data This case will be explained with reference to FIG. 8 and FIG. 11. Incidentally, in FIG. 11, the same steps as those in FIG. 9 have the same step reference numbers, and their explanation will be omitted as occasion demands.

In the case of recording the video data, the audio data, and the sub picture data, which are individually prepared in advance, the video data source 711, the audio data source 712, and the sub picture data source 713 are individually provided with the record storage, such as a video tape and a memory, and store a video data DV, an audio data DA, and a sub picture data DS, respectively.

These data sources are controlled by the control signal Sc8 giving an instruction for reading out the data from the system controller 520, and they transmit the video data DV, the audio data DA, and the sub picture data DS, to the video encoder 611, the audio encoder 612, and the sub picture encoder 613, respectively (step S61). Then, the video encoder 611, the audio encoder 612, and the sub picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted from the TS object generator 610 as information I6 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to change the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream taken into the memory 530 as the information I6, the file system/logical structure data generator 521 prepares the logical information file data D4 (step S24 and step S25). Then, after completing the record of a series of the TS object data D2, this is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input 12 such as the title information and the like form the user interface 720 onto these information stored in the memory 530, it is possible to prepare the logical information file data D4 with the file system/logical structure generator 521 and additionally record this onto the optical disc 100.

As described above, the information recording/reproducing apparatus 500 performs the record processing in the case of the recording the video data, the audio data, and the sub picture data, which are individually prepared in advance.

Incidentally, this record processing is applicable even when recording an arbitrary content the user has.

(i-4) The Case of Recording the Data by Authoring

Figure 12:
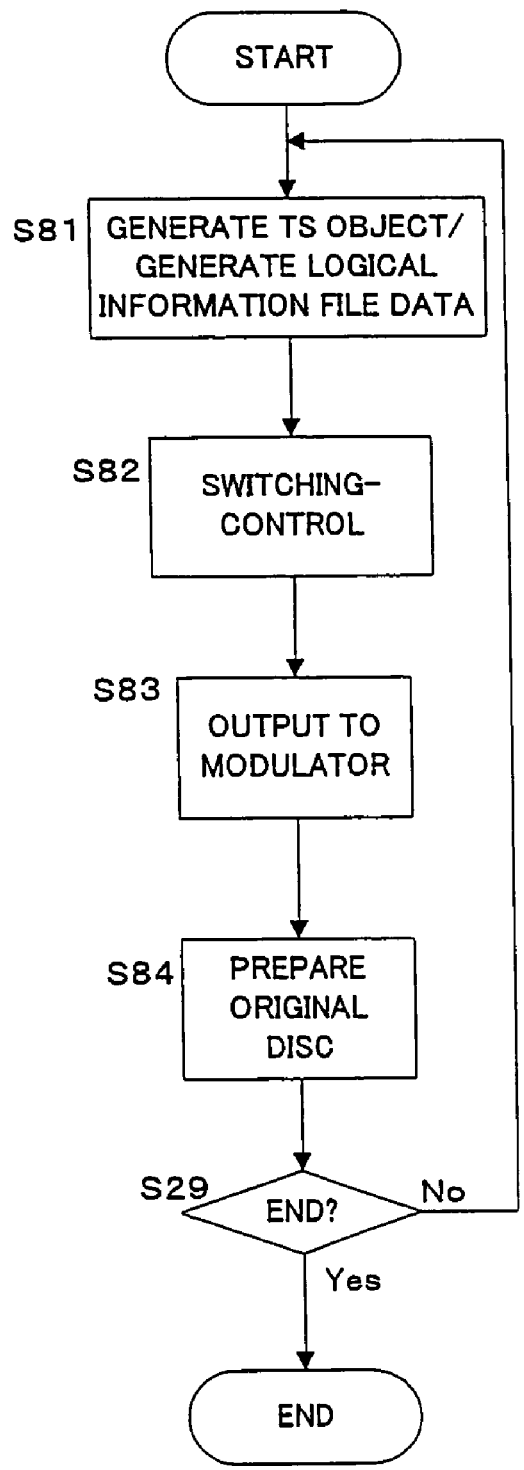
FIG. 12 is a flow chart showing a record operation (part 4) of the information recording/reproducing apparatus in the embodiment.

This case will be explained with reference to FIG. 8 and FIG. 12. Incidentally, in FIG. 12, the same steps as those in FIG. 9 have the same step reference numbers, and their explanation will be omitted as occasion demands.

In this case, by combining the above described three types of record processing in the three cases, an authoring system generates the TS object, the logical information file data, and the like in advance (step S81), and then completes the processing of switching-control performed at the formatter 608 (step S82). Then, the information obtained by this operation is transmitted to the modulator 606 equipped in front of and/or behind an original disc cutting machine, as the disc image data D5 (step S83), and this cutting machine prepares the original disc (step S84).

Particularly in the embodiment, in any cases of the above-explained (i-1) to (i-4) in the (i) Structure and Operation in Record System, the still picture information and the data associated with the control information (e.g. SP data, SP control information, their structural information or header, etc., which will be described later) are multiplexed and recorded onto the optical disc 100, in such a manner that they are included in the sub picture data. Moreover, the data associated with the control information of a still picture (a SP data identification flag, a SCP identification flag, or the like) is generated in the step S25 of generating the logical information file data or the like, and it is recorded through the formatter 608 into one portion of the object information file 130 (refer to FIG. 3) or the like, in such a form that it is associated with the still picture information (e.g. in a table form in which the data is associated by using an "entry section" described later).

(ii) Structure and Operation in Reproduction System

Next, the specific structure and operation of each constitutional element constituting the reproduction system in the information recording/reproducing apparatus 500 will be explained with reference to FIG. 8 and FIG. 13.

In FIG. 8, the user interface 720 inputs the title to be reproduced, its reproduction condition, and the like to the system controller 520 as the user input 12 of the title information and the like. In this case, the user interface 720 is controlled by the control signal Sc4 from the system controller 520, and it can perform the input processing according to the content to be reproduced, such as choosing through a title menu screen.

Responding to this, the system controller 520 controls the disc reproduction with respect to the optical disc 100, and the optical pickup 502 transmits a reading signal S7 to the demodulator 506.

The demodulator 506 demodulates a recorded signal recorded on the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included in the demodulated data D8 as being a multiplexed information part, the demultiplxer 508 is controlled by a control signal Sc2 from the system controller 520 to demultiplex the TS object data. Here, the control signal Sc2 is transmitted so as to start demultiplexing when completing an access to a reproduction position address by the reproduction control of the system controller 520.

The demultiplexer 508 transmits and supplies the video packet, the audio packet, and the sub picture packet, to the video decoder 511, the audio decoder 512, and the sub picture decoder 513, respectively. Then, the video data DV, the audio data DA, and the sub picture data DS are respectively decoded. Incidentally, the packets included in the transport stream, in each of which the PAT or the PMT is packetized as shown in FIG. 6, are respectively included as a part of the demodulated data D8; however, they are discarded or abandoned at the demultiplexer 508.

The adder 514 is controlled by a control signal Sc3 giving an instruction of the mixing from the system controller 520, and mixes or superimposes in a predetermined timing the video data DV and the sub picture data DS, which are respectively decoded at the vide decoder 511 and the sub picture decoder 513. The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Here, the specific example of a reproduction processing routine by the system controller 520 will be explained with reference to FIG. 13.

Figure 13:
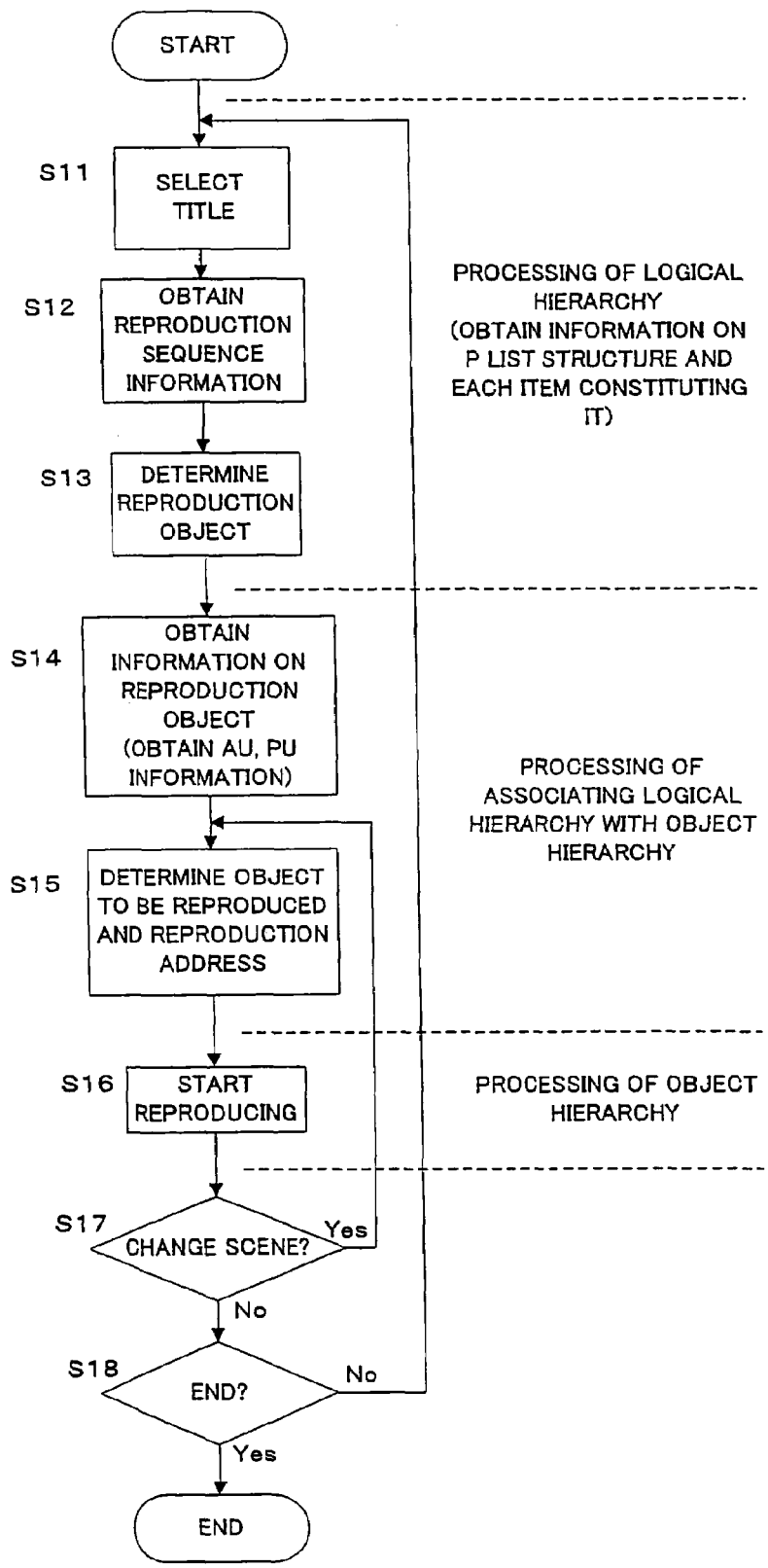
FIG. 13 is a flow chart showing a reproduction operation of the information recording/reproducing apparatus in the embodiment.

In FIG. 13, assume that as an initial condition, the recognition of the optical disc 100 in the reproduction system and the recognition of a volume structure and a file structure by the file system 105 (refer to FIG. 3) have been already completed by the system controller 520 and the file system/logical structure data interpret device 522 inside the system controller 520. Here, it will be explained the operational flow after obtaining the total number of the total titles from the disc comprehensive information 112 in the disc information file 110 and then choosing or selecting one title from among them.

Firstly, the choice or selection of the title is performed at the user interface 720 (step S11), and the system controller 520 obtains the information about the reproduction sequence from a reading result of the file system/logical structure data interpret device 522. More specifically, the processing of the logical hierarchy (i.e. obtaining the information for indicating a play list structure and the information about each of the Items constituting the play list structure (refer to FIG. 7)) is performed (step S12). By this, a reproduction object is determined (step S13).

Then, the object information file 130 related to the TS object as being the reproduction object is obtained. Especially in the embodiment, the AU information 1321 and PU (Presentation Unit) information 302I, which will be described later (refer to FIG. 34 described later), are also obtained as the information stored in the object information file 130 (step S14). These obtained information allow the association or correlation of the above described logical hierarchy and the object hierarchy (refer to FIG. 7).

Then, on the basis of the information obtained in the step S14, the object to be reproduced and the reproduction address are determined (step S15), and then the processing of the object hierarchy is started; namely, the actual reproduction is started (step S16).

While reproducing, it is monitored whether or not the command-input of a "scene change" corresponding to the change of the PU 302 in the AU 132 based on the PU information 302I and the AU information 132I, as described later is performed (step S17). If the "scene change" is command-inputted (step S17: Yes), the operational flow returns to the step S15, and the processes from the step S15 to the step S17 are repeatedly executed. On the other hand, if the "scene change" is not command-inputted (step S17: No), the presence or the absence of the command input indicative of ending the reproduction processing is judged (step S18). If there is not the command input indicating of ending (step S18: No), the operational flow returns to the step S11, and the processes inform the step S11 to the step S18 are repeatedly executed. On the other hand, if there is the command input indicative of ending (step S18: Yes), a series of the reproduction processing ends.

Particularly in the embodiment, in FIG. 8 and in the step S16 in FIG. 13, the sub picture data decoded by the sub picture decoder 513 is temporarily stored in the memory 540 which functions as a buffer. Then, as explained below, at least one of the SP control information (Still Picture control data) and the SP data (Still Picture data) included in the temporarily stored sub picture data is controlled by the control signal Sc5 from the system controller 520, to be thereby read out. Then, by operating the SP control information onto the SP data, the display of a still picture is performed as part or all of the video output.

Incidentally, it may be constructed such that the SP control information is temporarily stored in an exclusive area of the memory 530 (i.e. such that only the SP data is temporarily stored in the memory 540). Alternatively, it may be constructed such that such a memory 540 is constructed by using one portion of the memory 530.

(Obtaining Method of Obtaining SP Data and SP Control Information)

Next, the obtaining method of obtaining the SP data and the SP control information in the embodiment will be explained. This obtaining method is performed by the above-described information recording/reproducing apparatus 500 (refer to FIG. 8), mainly on the basis of the ES address information in the object information and the SP data and SP control information in the sub picture structure.

(A) First Obtaining Method of Obtaining SP Data and SP Control Information

Figure 18:
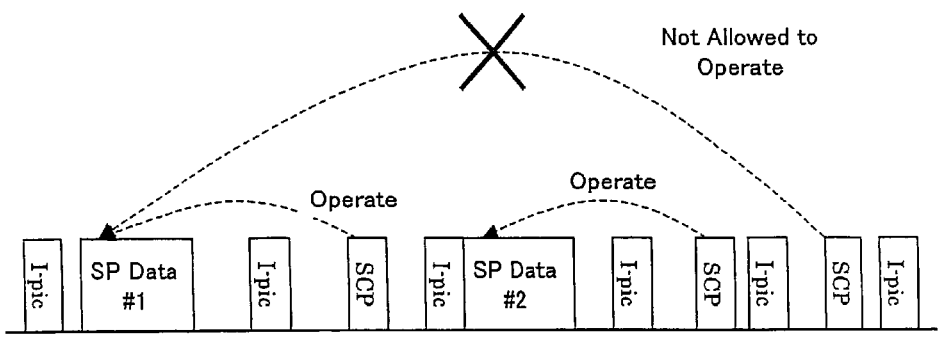
FIG. 18 is a conceptual diagram showing a packet arrangement condition adopted in the first obtaining method, on a time axis of the TS object.
Figure 19:
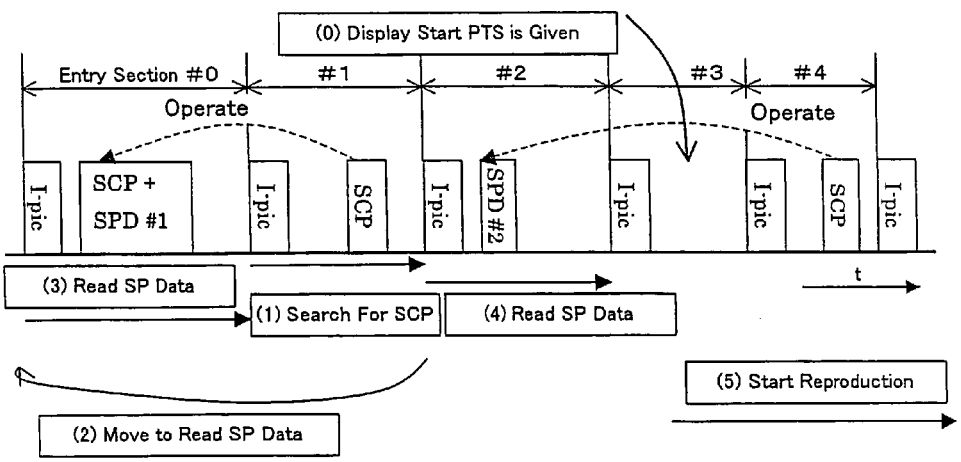
FIG. 19 is a conceptual diagram showing an obtaining procedure in the first obtaining method.

With reference to FIG. 14 to FIG. 20, the first obtaining method of obtaining the SP data and the SP control information and the reproduction control of a still picture associated with the first obtaining method will be explained. Here, FIG. 14 shows one example of the data structure of the ES address information associated with a video stream constructed in the ES map table in the object information, by using a table. FIG. 15 schematically shows one example of the positions of the TS packets registered in the ES address information of the video stream on the TS object with respect to a time axis (in the horizontal direction in FIG. 15). FIG. 16 shows the contents of the SP data, the SP control information, and structural information, associated with the first obtaining method. FIGS. 17 schematically show three types of sub picture structures constructed from these three data or information. FIG. 18 schematically shows an arrangement condition of each head packet of an I picture, the SP data, and the SP control information, adopted in the first obtaining method, on a time axis of the TS object. FIG. 19 schematically shows an obtaining procedure in the first obtaining method. FIG. 20 shows the data structure of the ES address information associated with a sub picture stream in the TS object shown in FIG. 19, by using a table.

The ES (Elementary Stream) address information of the video stream shown in FIG. 14 is written as one portion of the ES address information 134d (refer to FIG. 7) on the ES map table 134 shown in FIG. 3. Incidentally, the video stream here is regarded as an elementary stream of Index #14 shown on an ES map table in FIG. 34 described in detail later.

As shown in FIG. 14, as the content of the ES address information, only with respect to packets which satisfy a predetermined condition on the video stream, their packet numbers q, r, s, t, u, . . . (e.g. the serial number of the packets in the TS object, which will be referred to as a "packet number", as occasion demands) and the corresponding display start time point T14_0, T14_1, T14_2, T14_3, . . . are written.

In the embodiment, as shown in FIG. 15, the packets which satisfy the predetermined condition are determined to be the head packets of the I pictures based on the MPEG2 standard, and their packet number and the corresponding display start time points are written as the ES address information shown in FIG. 14. This is because MPEG decode can be started if a recording position can be specified by the address information with respect to the I picture.

Then, in the embodiment, as shown in FIG. 15, with respect to the arrangement of only the packets whose recording positions are specified by the ES address information, each section on the TS object specified by two adjacent packets is defined as an "entry section". For example, the section specified by the packet q and the packet r is regarded as an entry section #0. The section specified by the packet r and the packet s is regarded as an entry section #1. With respect to the SP data and the SP control information on the sub picture stream which corresponds to the video stream (i.e. which is displayed at the same time or in parallel with this) and which is associated with a still picture, their presence is written by whether or not they exist in a range of the entry section defined in this manner. Incidentally, the sub picture stream here is regarded as an elementary stream of Index #16 shown on the ES map table in FIG. 34 described in detail later. Thus, index number information 134e (which is "Index number=14" according to the embodiment) of the elementary stream used as the elementary stream is written in the Index #16 shown on the ES map table in FIG. 34 described in detail later.

As shown in FIG. 16, in the embodiment, the data or information associated with the still picture which is recorded onto the sub picture stream includes the following three data or information: (i) SP data 713 constituting one example of the still picture information; (ii) SP control information 712 constituting one example of the still picture control information for display-control of the SP data 713; and (iii) structural information (header) 711 which constitutes one sub picture structure with both or either one of the SP data 713 and SP control information 712, and which is related to the sub picture structure.

As a combination of these three data or information, there are a sub picture structure 701, including all the constituent elements of the structural information 711, the SP control information 712, and the SP data 713 shown in FIG. 17(a); a sub picture structure 702, including the constituent elements of the structural information 711 and the SP control information 712 shown in FIG. 17(b); and a sub picture structure 703, including the constituent elements of the structural information 711 and the SP data 713 shown in FIG. 17(c). Incidentally, in the case of the DVD, the type shown in FIG. 17(a) is only defined.

Incidentally, in the embodiment, as described above, various examples of the "still picture information set" associated with the present invention, are individually constructed from each of the sub picture structures shown in FIG. 17(a) to FIG. 17(c).

In the embodiment, as shown in FIG. 17(a) to FIG. 17(c), typically, the SP control information 712 and the SP data 713 are divided into the plurality of TS packets 146. The structural information 711 is stored in the head packet in the sub picture structures 701 to 703, and the head portion of the SP control information 712 following the structural information 711 (in FIG. 17(a) and FIG. 17(b)) or the head portion of the SP data 713 are also stored in the head packet in which the structural information 711 is stored.

In the embodiment, the TS packet 146 in which the head portion of the SP control information 712 in the sub picture structure 702 described above is stored is referred to as "SCP". The TS packet 146 in which the head portion of the SP data 713 in the sub picture structure 703 is stored is referred to as "SPD". Moreover, the head packet of the sub picture structure 701 including the both is referred to, in the corresponding form, as "SCP+SPD". In the present invention, "the sub picture structure is disposed in or belongs to the entry section" as shown in FIG. 15 means that the header including the SCP (i.e. the packet in which the structural information is stored) is recorded in the entry section, in each of the sub pictures structure 701 shown in FIG. 17(a) and the sub pictures structure 702 shown in FIG. 17(b). In the sub picture structure 703 shown in FIG. 17(c), it means that the header including the SPD is recorded in the entry section.

As shown in FIG. 16, the structural information 711 has a "SP data identifier". In the sub picture structures 701 and 703, the SP data identifier identifies the SP data 713 included in the sub picture structures 701 and 703. On the other hand, in the sub picture structure 702, the SP data identifier identifies the SP data 713 on which the SP control information 712 included in the sub picture structure 702 operates and which is included in the other sub picture structures.

The structural information 711 further has information for indicating "the data length of the SP control information" and "the data length of the SP data". On the basis of these, in reproducing, it is specified until which packet the sub picture structure 701 continues from the head of the structural information 711. Moreover, on the basis of the data length of the SP control information, in reproducing, it is specified until which packet the sub picture structure 702 continues from the head of the structural information 711. Furthermore, on the basis of the data length of the SP data, in reproducing, it is specified until which packet the sub picture structure 703 continues from the head of the structural information 711.

Incidentally, in the sub picture structure 702 not having the SP data 713, it is possible to indicate that the sub picture structure 702 does not have the SP data 713, by setting "the data length of the SP data" in the structural information 711 to be "0". In the same manner, in the sub picture structure 703 not having the SP control information 712, it is possible to indicate that the sub picture structure 703 does not have the SP control information 712, by setting "the data length of the SP control information" in the structural information 711 to be "0".

The structural information 711 further has "Position information of SP data". In reproducing, on the basis of this information, the SP data 713 on which the SP control information 712 operates is specified. As such position information of SP data, an approximate position of the SP data is written by using the entry section shown in FIG. 15. As a result, the SP data 713 can be specified by looking for the SPD in the entry section. Thus, even in a sub picture structure not having the SP data 713, such as the sub picture structure 702, the SP control information 712 owned by this sub picture structure can be operated onto the scheduled SP data. As the position information of SP data, the packet number of the SPD may be directly written.

Moreover, in the case of the sub picture structure 701 or 703 including the SP data 713, the "position information of SP data" owned by the structural information 711 may be set to be an invalid value. This is because in the case of these, the sub picture structure itself has the SP data, so that it is unnecessary to specify the recording position of the SP data (i.e. to specify the entry section) (incidentally, all of the packets constituting the sub picture structure are specified on the basis of the data length of the SP data or the like, as described above).

The SP control information 712 has information for indicating the display start time point of the SP data on which the SP control information 712 operates and the display time length of the SP data. By this, in reproducing, the SP data on which the SP control information 712 operates is reproduced only for a scheduled time length on a reproduction time axis, and thus the display of the still picture is performed.

The SP data 713 has image data in a bitmap data format or JPEG format which is Run Length Encoded, for example. For each picture element (pixel), it has 8 bits of color information data and 8 bits of transparency information data, for example. The SP data indicating one still picture is packetized and multiplexed to the plurality of TS packets 146 (refer to FIG. 4).

In the embodiment, as shown in FIG. 14 and FIG. 15, the entry section is expressed by using the display start time point of the packet number of the head packet constituting the entry section. For example, the entry section #0 of the elementary stream of Index #14 is expressed with "T14_0". By expressing the entry section with the display start time point in this manner, even if a packet or packets is lacked by editing or the like after recording, to thereby cause a missing or shifted number in the serial number of the packets, this does not cause a missing or shifting in the display start time point, so that it is unnecessary to update the ES address information or the like as shown in FIG. 14.

Particularly in the embodiment, in order to obtain the SCP and the SPD easily and quickly, the following condition (hereinafter referred to as a "first arrangement condition") is set to the packet disposal or arrangement with respect to the entry section defined in this manner.

Namely, as compared to the "display start time point" and the "packet number" of an entry point #I, the headers in the sub picture structures 701 to 703 including the SP control information 712 (which is assumed to maintain the display start time point "TT") are physically arranged as follows. Incidentally, the entry point indicates the packet whose position is specified by the address information.

If "Display start time point of entry point #i"
<=TT<"Display start time point of entry point #i+1",
  "Packet number of entry point #i"
<"Packet number of header of sub picture structure including SP control information"
<"Packet number of entry point #i+1".

In accordance with such a first arrangement condition, it is possible to find the sub picture structure 702 including the SP control information 712 required for the SP data 713 which is started to display, during the reproduction of the entry section, by searching the entry section.

For example, in FIG. 14 and FIG. 15, if the display start time point is equal to or greater than T14_1 and less than T14_2, the packet number of the header of the sub picture structure 702 including the SP control information 712 is recorded into the entry section #1. On the other hand, the SP data can be found from "the recording position of the SP data" (refer to FIG. 16) owned by the structural information 711 which constitutes the header as described above.

In addition to such a first arrangement condition, as shown in FIG. 18, the following condition (hereinafter referred to as a "second arrangement condition" is also set to the SCP (which is the head packet of the SP control information 712 as described above) in the first obtaining method.

"Packet number of SCP which operates on the i-th SP data"
<"Packet number of SCP which operates on the i+1-th SP data"

Namely, as shown in FIG. 18, such packet arrangement is not allowed that the SP data is controlled beyond the SCPs of other SP control information.

Incidentally, in FIG. 18, a dashed line drawn from the SCP indicates such a relationship that the SP control information whose head is the SCP operates on the SP data of the control object.

In the first obtaining method associated with the embodiment, under the first arrangement condition or the second arrangement condition, the SP data and the SP control information are obtained as shown in FIG. 19, by using the address information as shown in FIG. 20.

FIG. 19 schematically shows each process of reproduction at the corresponding position on a time axis (an axis extending from left to right in FIG. 19), each process being: at first, display start PTS is given as a (0) process; then, the SCP is searched for and read as a (1) process; then, moving to read the SP data as a (2) process; then, the SP data is read as a (3) process; then, the SP data is further read as a (4) process; and at last, reproduction is started as a (5) process.

Particularly in the first obtaining method, in order to obtain such a series of SP data and SP control information and perform the reproduction control of the still picture following the obtaining step, the ES address information about the sub picture stream as shown in FIG. 20 is written into the ES map table, in such a format that the SP data and the SP control information correspond to the entry section defined by the video stream shown in FIG. 14, for example.

As shown in FIG. 20, the ES address information about the sub picture stream includes two bits of information: one bit of a SP data identification flag for indicating whether or not the SPD exists; and one bit of a SCP identification flag for indicating whether or not the SCP is recorded, in each entry section of the elementary stream shown by the index number information 134*e* (refer to FIG. 34). Incidentally, in FIG. 20, the presence is "1", and the absence is "0". In the first obtaining method, as explained next, if the SCP identification flag shows that the SCP does not exist at the display start time point, it is checked whether or not it exists at an earlier time point on the reproduction time axis (the left side in FIG. 19).

In FIG. 19, in reproducing, at first, if the display start PTS in an entry section #3 (the (0) process), the SCP identification flag (refer to FIG. 20) of the ES address information included in the object information file is referred to, and it is checked whether or not the SCP exists in the entry section #3. In this example, the absence is found out, so that the SCP identification flag is further referred to, and the other entry sections which are placed at an earlier time on the reproduction time axis are searched to find the one in which the SCP exists. By this, in the example, the SCP to be read at first is found out to exist in the entry section #1.

Then, in FIG. 19, the SCP data is searched for in the entry section #1 in the object data file (the (1) process in FIG. 19). More specifically, at first, the ES address information in FIG. 14 is referred to, and then, the head packet of the entry section #1 (which is "r" in the example) is obtained. Then, access to the head packet is performed in the object data file. Then, the headers (or the structural information 711) of the packets on the same sub picture stream which follow the head packet are sequentially checked, to thereby find out the sub picture structure 702 including the SCP in the entry section #1.

Then, the "SP data position" (refer to FIG. 16) recorded in the SP control information in the sub picture structure including the obtained SCP is referred to, to thereby specify the position of the SP data (the entry section) which is the control object of the SP control information. Then, access to the SP data whose position is specified is performed (the (2) process in FIG. 19). For example, if the display start time point T14_0 is written as the position of the SP data (the entry section), at first, the ES address information as shown in FIG. 14 is referred to in the object information file, and the packet number "q" is obtained. Namely, in this example, the SPD to be read is found out to exist in the entry section #0. Then, access to the head packet (the packet number "q") is performed in the object data file. Then, the headers (or the structural information 711) of the packets on the same sub picture stream which follow the head packet are sequentially checked, to thereby find out the sub picture structure 701 or 703 including the SPD (or the sub picture structure 701 shown with "SCP+ SPD#1" in FIG. 19) in the entry section #0.

Then, the SP data in the sub picture structure including the obtained SPD (SCP+SPD) is read (the (3) process in FIG. 19).

Then, the SP data identification flag shown in FIG. 20 is referred to again, and the presence of such a section is checked that the SP data identification flag is "1" from the entry section including the SPD obtained in the (3) process (which is the entry section #0 in this case) to the entry section including the display start time point (which is the entry section #3 in this case) and that the SPD is included. If such SPD exists, that means there is the SP data which is possibly displayed after the display start time point. In this example, such SPD exists in the entry section #2, so that the sub picture structure including the SPD is accessed, and the SPD is obtained (the (4) process in FIG. 19).

Incidentally, in the present invention, such SP data that is not required to be displayed at any display start time point but required to be read in advance or look ahead to perform the still-picture-display after the any display start time point on the reproduction time axis accurately and without stopping and that is recorded before the any display start time point, is referred to as "look-ahead SP data". Namely, if the look-ahead SP data is not read before the reproduction starts, the still-picture-display possibly stops after the display starts. After the look-ahead SP data is looked ahead or foreseen, it may not be actually used for the still-picture-display. Namely, here, if there is a possibility to use it for the subsequent display in accordance with the reproduction condition, it is treated as the look-ahead SP data, and the process of looking ahead or foreseeing this data is performed.

Then, the display control based on the SP control information obtained by the above processes is performed, and the still-picture reproduction corresponding to the SP data is started (the (5) process in FIG. 19). For example, on the basis of the display start time point and the display time length (refer to FIG. 16) indicated by the SP control information, the still-picture-display is performed by the sub picture corresponding to the SP data over a predetermined period.

As described above, by virtue of the series of processes shown in FIG. 19, even in the case where the display is started from any display start time point in the special reproduction, such as time search, chapter search, fast-forwarding, and rewinding, a still picture to be originally displayed at the display start time point is faithfully displayed. Moreover, the following cases do not occur: namely, the case where the still picture to be originally displayed at the display start time point cannot be displayed; and the case where the display of the still picture is stopped.

As explained with reference to FIG. 14 to FIG. 20, according to the first obtaining method of the SP data and the SP control information, it is possible to efficiently specify the recording positions of the SP data and the SP control information by using the ES address information having an extremely small data amount of 2 bits in total of the two flag (refer to FIG. 20). For example, if the ES address information associated with the video stream as shown in FIG. 14 is 32 bits in each entry section, a small data amount of ⅛ times as large is enough for the ES address information associated with the sub picture stream as shown in FIG. 20.

(B) Second Obtaining Method of Obtaining SP Data and SP Control Information

With reference to FIG. 21 to FIG. 24, FIG. 14, and FIG. 15, the second obtaining method of obtaining the SP data and the SP control information and the reproduction control of a still picture associated with the second obtaining method will be explained. Here, FIG. 21 shows the contents of the SP data, the SP control information, and the structural information, associated with the second obtaining method. FIG. 22 schematically shows an obtaining procedure in the second obtaining method. FIG. 23 shows the data structure of the ES address information associated with the sub picture stream shown in FIG. 22 constructed in the ES map table, by using a table. FIG. 24 shows a specific example of the structural information and the SP control information, associated with the second obtaining method.

In the above-described first obtaining method, the first and second arrangement conditions are set, but the second obtaining method described below is performed without setting the second arrangement condition explained with reference to FIG. 18 out of the two conditions. Particularly, the SP data identification flag (refer to FIG. 20) in the above-described first obtaining method is not constructed in the ES address information, and only the SCP identification flag is written as the ES address information for the sub picture stream. Instead of not writing the SP data identification flag in the ES address information in the object information file, information for specifying the look-ahead SP data is written in the SP control information in the object data file.

As shown in FIG. 21, in the embodiment associated with the second obtaining method, the data or information associated with a still picture recorded on the sub picture stream includes the structural information 711, SP control information 712', and the SP data 713. Out of them, the contents of the structural information 711 and the SP data 713 are the same as those associated with the first obtaining method shown in FIG. 16. By a combination of the three data or information, the three types of sub picture structures 701 to 703 shown in FIG. 17 are constructed in the same manner.

The SP control information 712' associated with the second obtaining method has information for indicating the display start time point of the SP data on which the SP control information 712' operates and the display time length of the SP data. By this, in reproducing, the SP data on which the SP control information 712' operates is reproduced only for a scheduled time length on the reproduction time axis, and thus the display of the still picture is performed.

Moreover, the SP control information 712' has the total number of the look-ahead SP data, an identifier of the look-ahead SP data, and the position information of the look-ahead SP data (the entry section). The "look-ahead SP data" here is defined on the basis of the recording position of the SCP of the SP control information in which its total number or the like is written. The "look-ahead SP data" indicates the SP data on which such SP control information operates that has the SCP recorded after the SCP of the SP control information on the reproduction time axis, and is the SP data which is recorded before the SCP of the SP control information. Therefore, in the explanation associated with the second obtaining method below, the SP data which satisfies the above conditions is merely referred to as the "look-ahead SP data".

In the second obtaining method associated with the embodiment, the SP data and the SP control information are obtained as shown in FIG. 22, by using the address information as shown in FIG. 23.

FIG. 22 schematically shows each process of reproduction at the corresponding position on a time axis (an axis extending from left to right in FIG. 19), each process being: at first, display start PTS is given as a (0) process; then, the SCP in the forward entry section is searched for and read as a (1) process; then, moving to read the SP data as a (2) process; then, the SCP in the backward entry section is read as a (3) process; then, the SP data is read as a (4) process; then, the look-ahead SP data is read as a (5) process; and at last, reproduction is started as a (6) process.

Particularly in the second obtaining method, in order to obtain such SP data and SP control information and perform the reproduction control of the still picture following the obtaining step, the ES address information about the sub picture stream as shown in FIG. 23 is written into the ES map table, in such a format that the SP data and the SP control information correspond to the entry section defined by the video stream shown in FIG. 14, for example.

As shown in FIG. 23, the ES address information about the sub picture stream includes one bit of the SCP identification flag for indicating whether or not the SCP is recorded, in each entry section. Incidentally, in FIG. 23, the presence is "1", and the absence is "0". In the second obtaining method, as explained next, if the SCP identification flag shows that the SCP does not exist at the display start time point, at first, it is checked whether or not the SCP exists at an earlier time point on the reproduction time axis, and then it is checked whether or not the SCP exists at a later time point on the reproduction time axis.

Incidentally, as shown in FIG. 24, as opposed to the sub picture structure in FIG. 21 including the SP data, the sub picture structure not having the SP data is constructed from the structural information 711 and SP control information 712". FIG. 24 shows the specific content of the SP control information 712" in which SCP #2a disposed in an entry section #4 is the head packet, as a specific example corresponding to FIG. 22 and FIG. 23.

In FIG. 22, in reproducing, at first, if the display start PTS in the entry section #3 (the (0) process), the SCP identification flag (refer to FIG. 23) of the ES address information included in the object information file is referred to, and it is checked whether or not the SCP exists in the entry section #3. In this example, the absence is found out, so that the SCP identification flag is further referred to, and at first, the other entry sections which are placed at an earlier time on the reproduction time axis are searched to find the one in which the SCP exists. By this, in the example, the SCP to be read at first is found out to exist in the entry section #1.

Then, in FIG. 22, the SCP data is searched for in the entry section #1 in the object data file (the (1) process in FIG. 22). More specifically, at first, the ES address information in FIG. 14 is referred to, and then, the head packet of the entry section #1 (which is "r" in the example) is obtained. Then, access to the head packet is performed in the object data file. Then, the headers (or the structural information 711) of the packets on the same sub picture stream which follow the head packet are sequentially checked, to thereby find out the sub picture structure 702 including the SCP in the entry section #1.

Then, the "SP data position" recorded in the SP control information in the sub picture structure including the obtained SCP is referred to, to thereby specify the position of the SP data (the entry section) which is the control object of the SP control information. Then, access to the SP data whose position is specified is performed (the (2) process in FIG. 22). For example, if the display start time point T14_0 is written as the position of the SP data (the entry section), at first, the ES address information as shown in FIG. 14 is referred to in the object information file, and the packet number "q" is obtained. Namely, in this example, the SPD to be read is found out to exist in the entry section #0. Then, access to the head packet (the packet number "q") is performed in the object data file. Then, the headers (or the structural information 711) of the packets on the same sub picture stream which follow the head packet are sequentially checked, to thereby find out the sub picture structure 701 or 703 including the SPD (or the sub picture structure 703 shown with "SCP#1a+ SPD#1" in FIG. 22) in the entry section #0.

Then, the SP data in the sub picture structure including the obtained SPD is read (the (2) process in FIG. 22).

Then, the other entry sections which are placed at a later time on the reproduction time axis are searched to find the one in which the SCP exists. By this, in the example, the SCP to be read at first is found out to exist in the entry section #4.

In FIG. 22, this time, the SCP data is searched for in the entry section #4 in the object data file (the (3) process in FIG. 22). More specifically, at first, the ES address information in FIG. 14 is referred to, and then, the head packet of the entry section #4 (which is "u" in the example) is obtained. Then, access to the head packet is performed in the object data file. Then, the headers (or the structural information 711) of the packets on the same sub picture stream which follow the head packet are sequentially checked, to thereby find out the sub picture structure 702 including SCP #2a and the sub picture structure 702 including SCP #1c in the entry section #4. Then, the SP control information 712" having the structure shown in FIG. 24 is obtained. Incidentally, FIG. 24 shows the specific content of the SP control information 712 with respect to the SCP #1c.

Then, the "SP data position" (refer to FIG. 24) recorded in the SP control information in the sub picture structure including the obtained SCP #2a is referred to, to thereby specify the position of the SP data (the entry section) which is the control object of the SP control information. Then, access to the SP data whose position is specified is performed (the (4) process in FIG. 22). For example, if the display start time point T14_2 is written as the position of the SP data (the entry section), at first, the ES address information as shown in FIG. 14 is referred to in the object information file, and the packet number "s" is obtained. Namely, in this example, the SPD to be read is found out to exist in the entry section #2. Then, access to the head packet (the packet number "s") is performed in the object data file. Then, the headers (or the structural information 711) of the packets on the same sub picture stream which follow the head packet are sequentially checked, to thereby find out the sub picture structure 701 or 703 including the SPD (the sub picture structure 703 shown with "SPD#2" in FIG. 22) in the entry section #2.

Then, the SP data in the sub picture structure including the obtained SPD is read (the (4) process in FIG. 22).

Then, the look-ahead SP data is read on the basis of the total number, the identifier, and the position information (entry section) of the look-ahead SP data written in the SP control information in the sub picture structure including the SCP#1c obtained in the (3) process in FIG. 22 (refer to FIG. 24). For example, as shown in FIG. 24, if the total number of the look-ahead SP data is "1", its identifier is "1", and the position information of look-ahead SP data "#1" identified by the identifier is T14_0, at first, the ES address information in FIG. 14 is referred to, and the packet number q is obtained. After accessing the packet with the packet number q, the sub picture structure including the SP data is find out from among a plurality of packets which follows the packet with the packet number q in the entry section #0, and it is read as the look-ahead SP data (the (5) process in FIG. 22).

Incidentally, in the specific example, since the look-ahead SP data #1 is already obtained in the (2) process, an obtainment operation may be not performed again.

Then, the display control based on the SP control information obtained by the above processes is performed, and the still-picture reproduction corresponding to the SP data is started (the (6) process). For example, on the basis of the display start time point and the display time length (refer to FIG. 21) indicated by the SP control information, the still-picture-display is performed by the sub picture corresponding to the SP data over a predetermined period.

As described above, by virtue of the series of processes shown in FIG. 22, even in the case where the display is started from any display start time point in the special reproduction, such as time search, chapter search, fast-forwarding, and rewinding, a still picture to be originally displayed at the display start time point is displayed. Moreover, the following cases do not occur: namely, the case where the still picture to be originally displayed at the display start time point cannot be displayed; and the case where the display of the still picture is stopped.

As explained with reference to FIG. 21 to FIG. 24, FIG. 14, and FIG. 15, according to the second obtaining method for the SP data and the SP control information, it is possible to efficiently specify the recording position of the SP control information by using the ES address information having an extremely small data amount of 1 bit in total of the one flag (refer to FIG. 23). For example, if the ES address information associated with the video stream as shown in FIG. 14 is 32 bits in each entry section, a small data amount of 1/32 times as large is enough for the ES address information associated with the sub picture stream as shown in FIG. 23.

As described above, even in either one of the first and second obtaining methods in the embodiment explained with reference to FIG. 14 to FIG. 24, it is unnecessary to read the sub picture structure including the SP data 713 of the control object, at each time of the display control by the SP control information in reproducing, by adopting the three types of sub picture structures 701 to 703, as shown in FIG. 17. On the other hand, it is possible to perform display-control with respect to one SP data 713 by the SP control information recorded aside from the one SP data 713. In particular, it is also possible to operate a plurality of SP control information onto the same SP data. Alternatively, it is possible to display-control a plurality of SP data 713 by the same SP control information recorded aside from the plurality of SP data 713.

Incidentally, the sub picture structure 701 or 703 including the SP data 713 of this type, and the sub picture structure 702 including the SP control information 712 which operates on the SP data 713 may be recorded on the same sub picture stream, and they may be recorded separately on a plurality of sub picture streams.

(Specific Example of Reproduction Control of Still Picture by SP Control Information)

Next, a specific example of the reproduction control of a still picture by operating the SP control information onto the SP data obtained in the above manner in the embodiment will be explained with reference to FIG. 25 to FIG. 29 and the above-described FIG. 14 to FIG. 17. This obtaining method is performed by the above-described information recording/reproducing apparatus 500 (refer to FIG. 8) mainly on the basis of the SP data and the SP control information in the sub picture structure.

Figure 25:
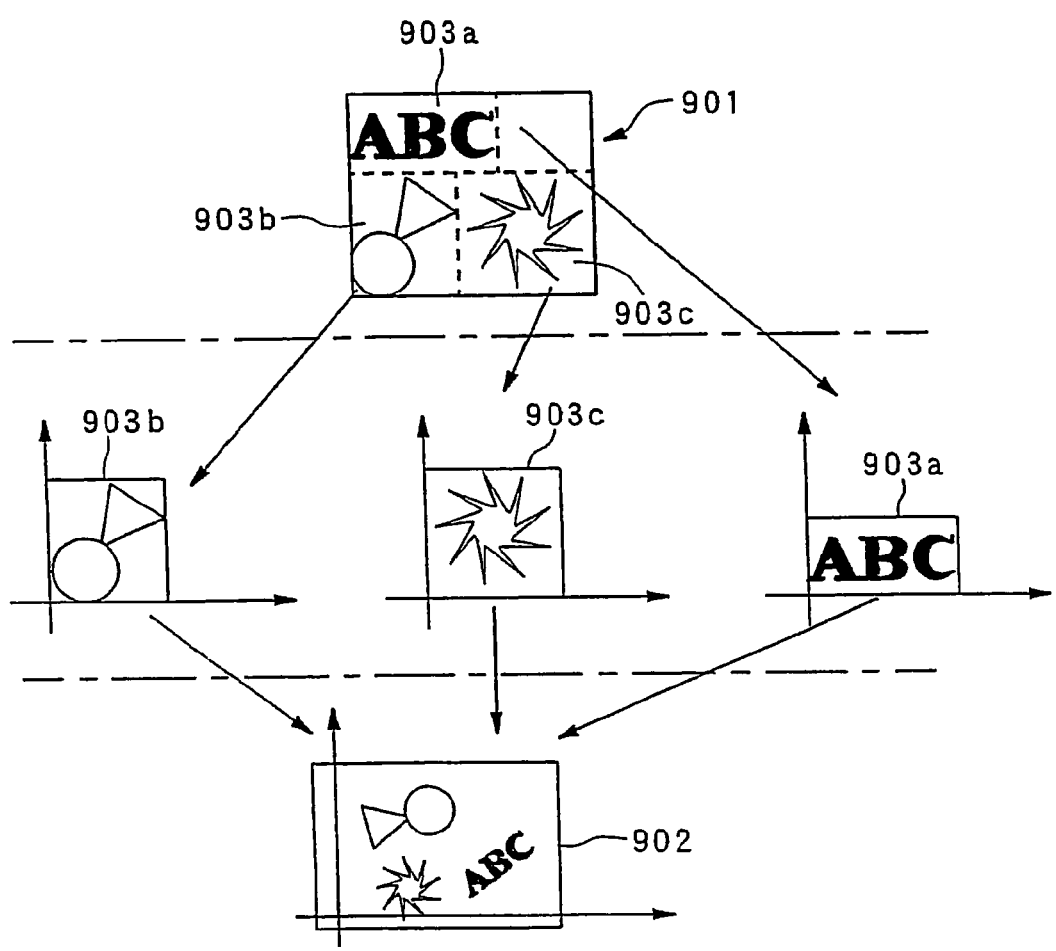
FIG. 25 is a conceptual diagram showing such a form that a new sub picture is formed by operating the SP control information onto the SP data, to thereby form, in a specific example of reproduction control of a still picture associated with the embodiment.
Figure 26A:
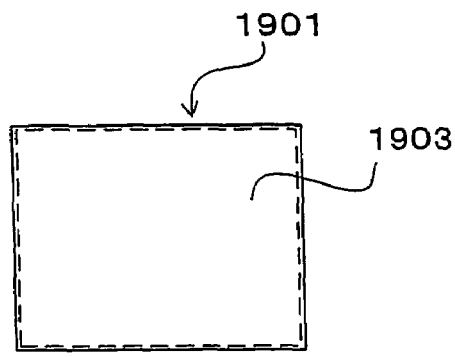
FIG. 26 are conceptual diagrams showing such a form that a sub frame is cut out of the SP data, in a specific example of the reproduction control of a still picture.
Figure 26B:
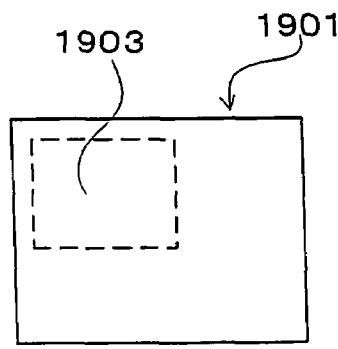
Figure 26D:
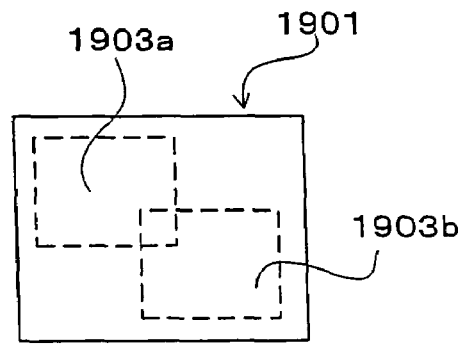
Figure 26C:
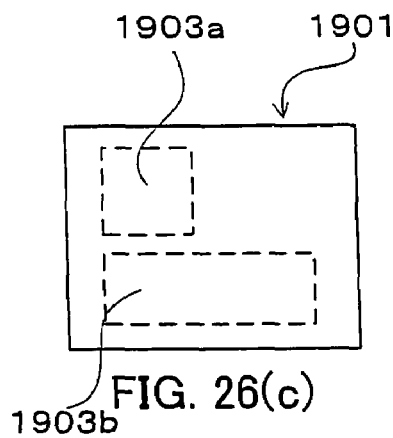
Figure 26E:
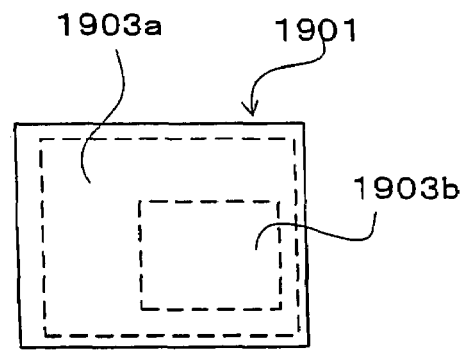
Figure 27:
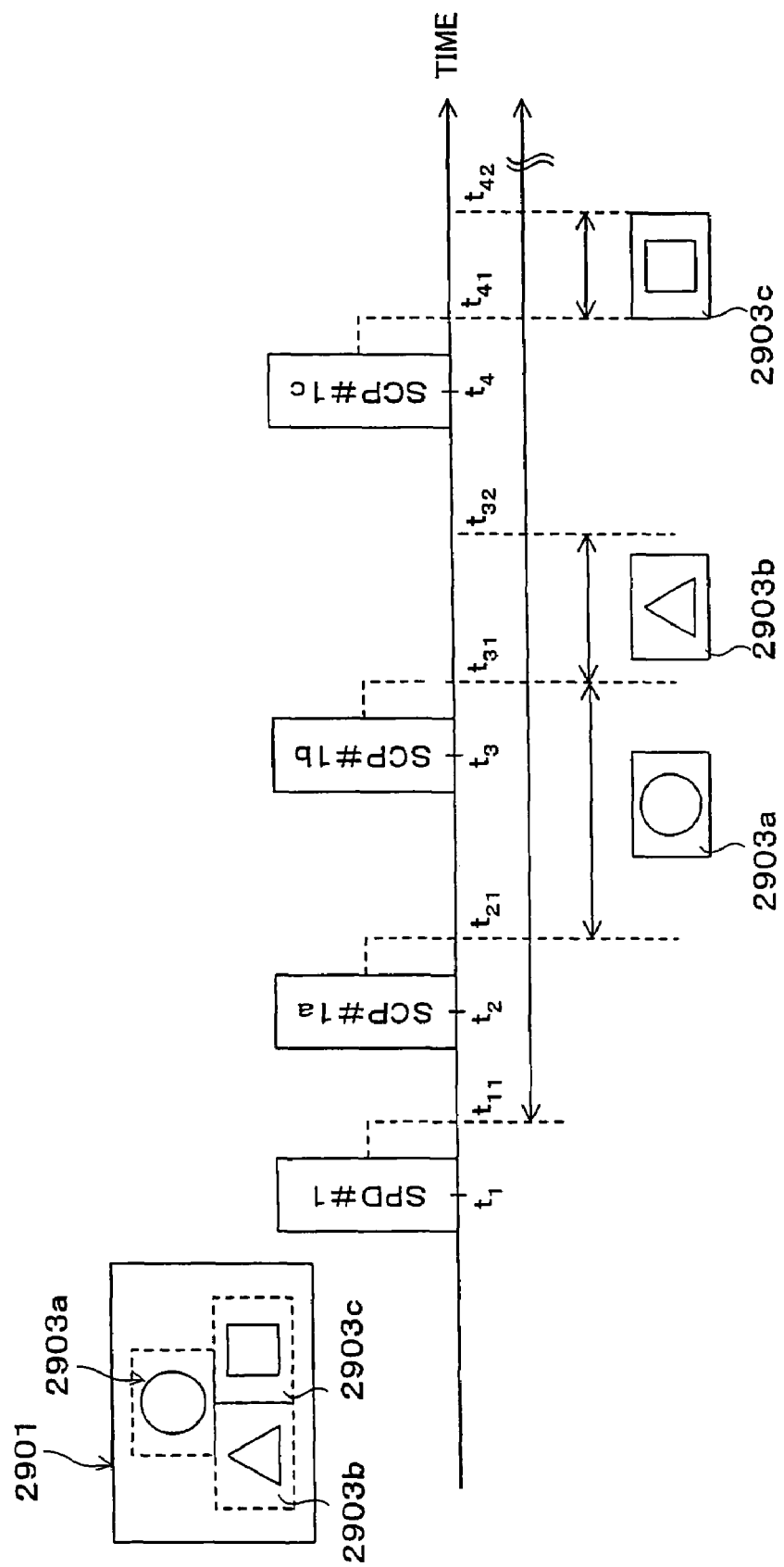
FIG. 27 is a conceptual diagram showing such a control form that a sub frame is cut out of the SP data and is displayed, in a specific example of the reproduction control of a still picture.

Here, the explanation is about the reproduction control with respect to the SP data included in one sub picture data structure 701 or 703 shown in FIG. 17(a) or FIG. 17(c), the reproduction control being performed by operating the SP control information included in another sub picture structure 701 or 702 shown in FIG. 17(a) or FIG. 17(b), which is different from the above sub picture data structure. FIG. 25 schematically shows a method of forming a new still picture (sub picture) by operating the SP control information onto the SP data. FIGS. 26 schematically show a method of cutting a sub frame out of a sub picture. FIG. 27 schematically shows a method of cutting a sub frame out of a sub picture and displaying it by using the sub frame. Moreover, FIG. 28 and FIG. 29 schematically show methods of cutting a sub frame out of a sub picture and displaying it.

The reproduction control in the specific example is to display a new still picture by operating the SP control information, which is obtained aside from the SP data by the above-described first or second obtaining method from the same sub picture stream, onto the SP data, which is obtained in the same manner as the above-described first or second obtaining method from the same sub picture stream.

As shown in FIG. 25, in the reproduction control in the specific example, for example, with respect to he SP data in one sub picture structure 701 or 703 (refer to FIG. 17(a) or FIG. 17(c)) used for displaying one still picture, i.e. sub picture 901, the SP control information in a different sub picture structure 701 or 702 (refer to FIG. 17(a) or FIG. 17(b)) is operated, to thereby display a new still picture, i.e. sub picture 902. More specifically, the sub picture 901 is cut out in each range of sub frames 903a, 903b, and 903c. Moreover, on a display screen, the new sub picture 902 is displayed so that the cut sub frame 903a is rotated and placed in the lower right corner of the sub picture 902, that the sub frame 903b is rotated and placed in the upper left corner, and that the sub frame 903c is placed in the lower left corner.

The conditions, such as a range of cutting out the sub frame, arrangement in displaying, scaling up and down, and rotation, are written in the SP control information 712. Therefore, by using one sub picture structure 701 and operating the SP control information 712 included in the one sub picture structure 701 onto the SP data 713 included in the one sub picture structure 701 in the same manner, one sub picture 901 is displayed. Then, by operating the SP control information 712 included in another sub picture structure 702 onto the SP data 713, the new sub picture 902 can be displayed. Alternatively, by operating the SP control information 712 included in one sub picture structure 702 onto the SP data 713 included in another sub picture structure 703, one sub picture 901 is displayed. Then, by operating the SP control information 712 included in another sub picture structure 702 onto the SP data 713, the new sub picture 902 can be displayed. Alternatively, by operating the SP control information 712 included in one sub picture structure 701 onto the SP data 713 included in another sub picture structure 703, one sub picture 901 is displayed. Then, by operating the SP control information 712 included in another sub picture structure 701 onto the SP data 713, the new sub picture 902 can be displayed. Except these, there are conceivable various combinations of the SP data and the SP control information which operates on the SP data.

In any case, it is possible to save the limited recording capacity on a disc by using many times or sharing the SP data constructed from the bitmap data or JPEG data having a large data amount. Moreover, it is possible to perform efficient reproduction and display processing.

In addition, in any case, it is possible to superimpose such a sub picture 901 or 902 onto a motion picture or main picture (video) based on the video data recorded in another video stream.

As shown in FIG. 26, with respect to the cutting of a sub frame 1903 from a sub picture 1901, various forms can be written in the SP control information as follows and the cutting is performed: namely, in the case where the sub picture 1901 is matched with sub frame 1903 [FIG. 26(a)]; in the case where one sub frame 1903 is designated in any narrower range than the sub picture 1901 [FIG. 26(b)]; in the case where there are sub frames 1903a, 1903b, etc. in any one or more ranges narrower than the sub picture 1901 [FIG. 26(c)]; in the case where there are sub frames 1903a, 1903b, etc. superimposing in any one or more ranges narrower than the sub picture 1901 [FIG. 26(d)]; in the case where there are sub frames 1903a, 1903b, etc, one of which includes the other in any one or more ranges narrower than the sub picture 1901 [FIG. 26(e)]; or the like.

Next, examples of display using the above-described sub picture structure will be explained with reference to FIG. 27 and the block diagram of the information recording/reproducing apparatus 500 in FIG. 8. Incidentally, the stream structure in the present invention is such that a SPD (i.e. the head packet of the SP data) and a plurality of SCP (i.e. the head packet of the SP control information) following the SPD are disposed on one elementary stream.

The SP data for defining a sub picture 2901 is written such that SPD#1 is the head packet. The SP data is read, starting from a time point t1, and stored into the memory 540. A time point t11 at which the SP data is all stored into the memory 540 is a stat time point of an effective period for the SP data. This image is effective until the reading of new SP data is started, and maintained in the memory 540. Then, the SP control information having SCP#1a as the head packet is read at a time point t2. The description contents are interpreted by the file system/logical structure data interpret device 522. The SP control information operates onto the SP data stored in the memory 540 by the control signal Sc5. By this, the SP data in the memory 540 is cut out in a range of sub frame 2903a, and video-outputted through the adder 514 from a time point t21. Under the control of the system controller 520, the SP data may be superimposed onto a video signal from the video decoder 511 on the adder 514.

Then, the SP control information having SCP#1b as the head packet is read at a time point t3 and operates onto the SP data in the memory 540 in the same manner. By this, the SP data in the memory 540 is cut out in a range of sub frame 2903b, and video-outputted in place of the sub frame 2903a from a time point t31 to a time point t32. Moreover, the SP control information having SCP#1c as the head packet is read at a time point t4 and operates onto the SP data in the memory 540 in the same manner. By this, the SP data in the memory 540 is cut out in a range of sub frame 2903c, and video-outputted from a time point t41 to a time point t42. The SP data may be superimposed onto a video signal in the same manner as the case of the sub frame 1903a. Moreover, without limiting the construction to the above-described display form, it is obviously possible to write, into the SP control information, such content that the sub frames 2903a to 2903c are overlapped to display.

Next, a specific example will be explained with reference to FIG. 28.

Figure 28A:
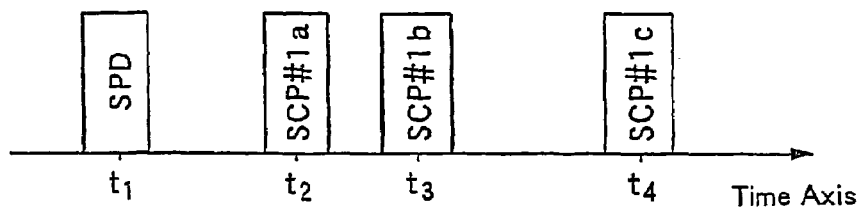
FIG. 28 are conceptual diagrams showing one specific example in which a sub frame is cut out of the SP data and is displayed, in a specific example of the reproduction control of a still picture.
Figure 28B:
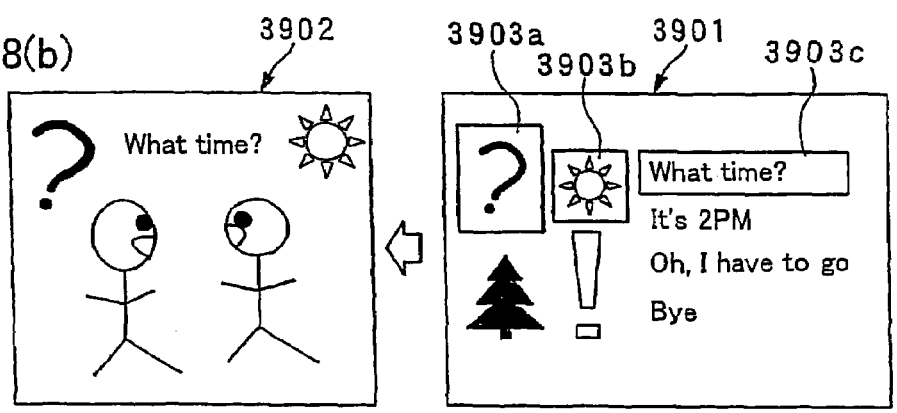
Figure 28C:
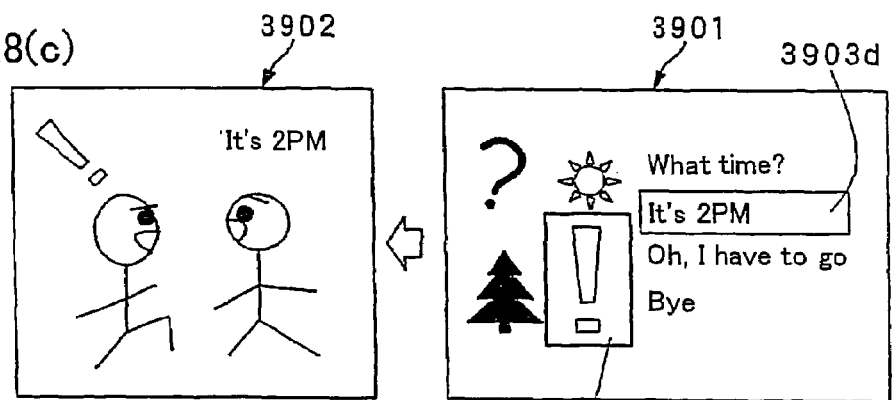
Figure 28D:
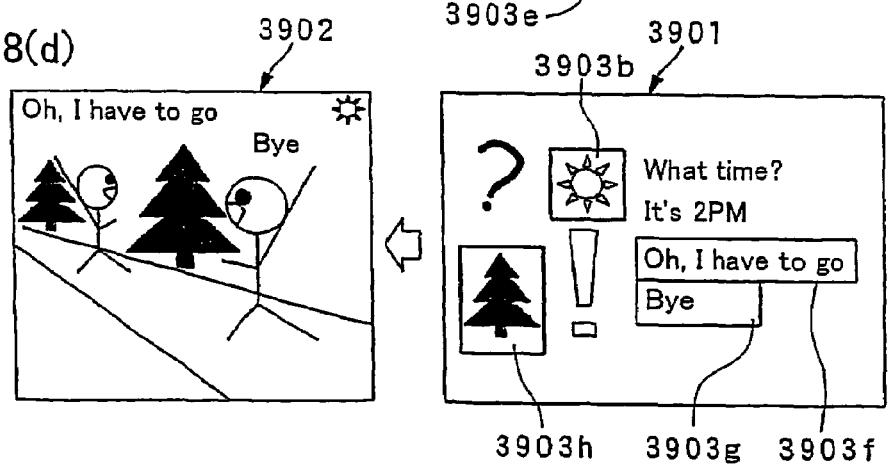
Figure 29:
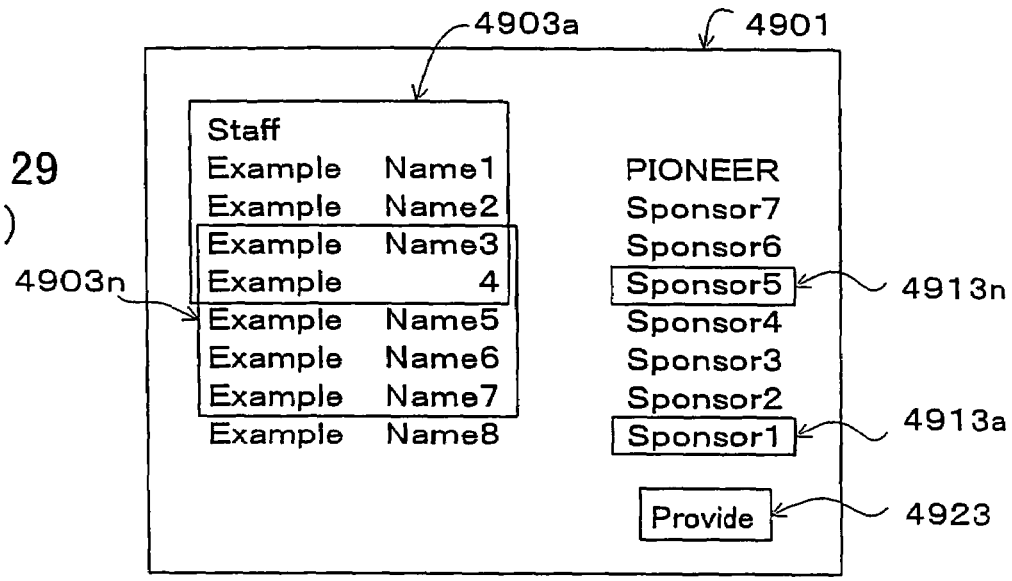
FIG. 29 are conceptual diagrams showing another specific example in which a sub frame is cut out of the SP data and is displayed, in a specific example of the reproduction control of a still picture.
Figure 29:
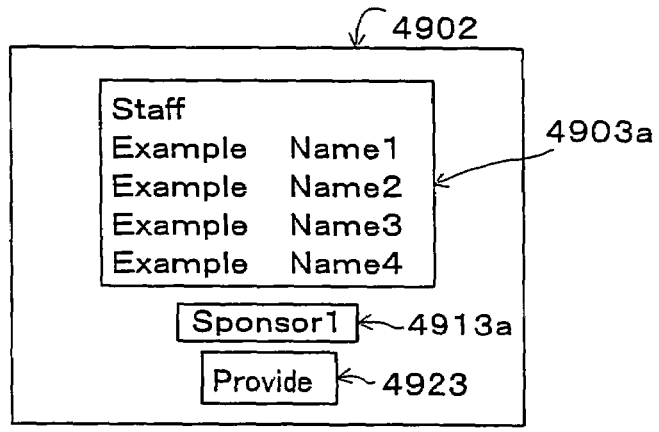
Figure 29:
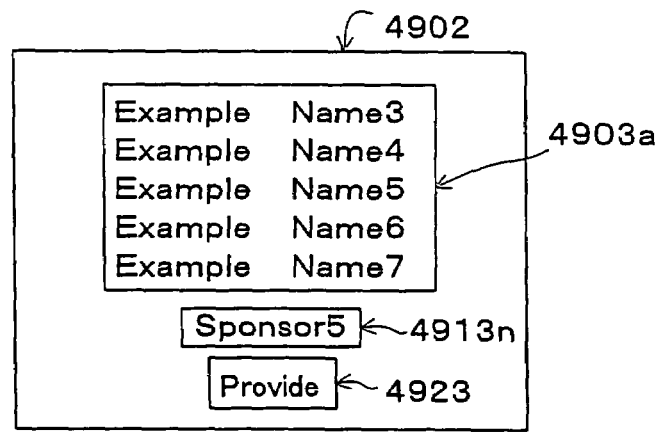

As shown in FIG. 28(a), it is assumed that the SP data in which the SPD is the head packet is reproduced at the time point t1, that the SP control information having the SCP#1a as the head packet is reproduced at the time point t2, that the SP control information having the SCP#1b as the head packet is reproduced at the time point t3, and that the SP control information having the SCP#1c as the head packet is reproduced at the time point t4. FIG. 28(b), FIG. 28(c), and FIG. 28(d) are displayed images as a result of the display control corresponding to the SCP#1a, the SCP#1b, and the SCP#1c, respectively. Moreover, human figures and a road in FIG. 28(b), FIG. 28(c), and FIG. 28(d) are video picture from different streams.

At first, a sub picture 3901 is reproduced at the time point t1 and stored into the memory 540. Then, the SP control information having the SCP#1a as the head packet is reproduced at the time point t2. Sub frames 3903a, 3903b, and 3903c in the sub picture 3901 are cut out and displayed on the video picture, according to placement, size, angle, or the like written by the SP control information. Then, the SP control information having the SCP#1b as the head packet is reproduced at the time point t3. Sub frames 3903d and 3903e are cut out and displayed in the same manner. Moreover, the SP control information having the SCP#1c as the head packet is reproduced at the time point t4. Sub frames 3903f, 3903g, and 3903h are cut out and displayed in the same manner.

Then, with reference to FIGS. 29, another specific example will be explained. In this example, the displayed image can be scrolled.

As shown in FIG. 29, as a sub picture 4901, the SP data desired to be scrolled is arranged according to a predetermined rule [FIG. 29(a). Here, as described above, the SP control information is operated at predetermined time intervals. It is written into the SP control information that the designation of the sub frame 4903 at that time sequentially moves from the sub frame 4903a to the sub frame 4903n.

FIG. 29(b) shows a sub picture 4902 controlled by the first SP control and shows that sub frames 4903a, 4913a, and 4923 are displaced at designated positions. FIG. 29(c) shows the sub picture 4902 controlled by the n-th SP control and shows that sub frames 4903n, 4913n, and 4923 are displaced at designated positions. Incidentally, it is written in each SP control information that a window of "provide" is always displayed at this position and does not change. As a result, the following picture is obtained: the window of "provide" does not move on the sub picture 4902, a window of "Example Name" scrolls from down to up, and a window of "Sponsor" scrolls from up to down. Incidentally, it is obviously possible to scroll to the left or right, or in an arbitrary direction, according to the description of the SP control information.

(Access Flow in reproducing)

Figure 30:
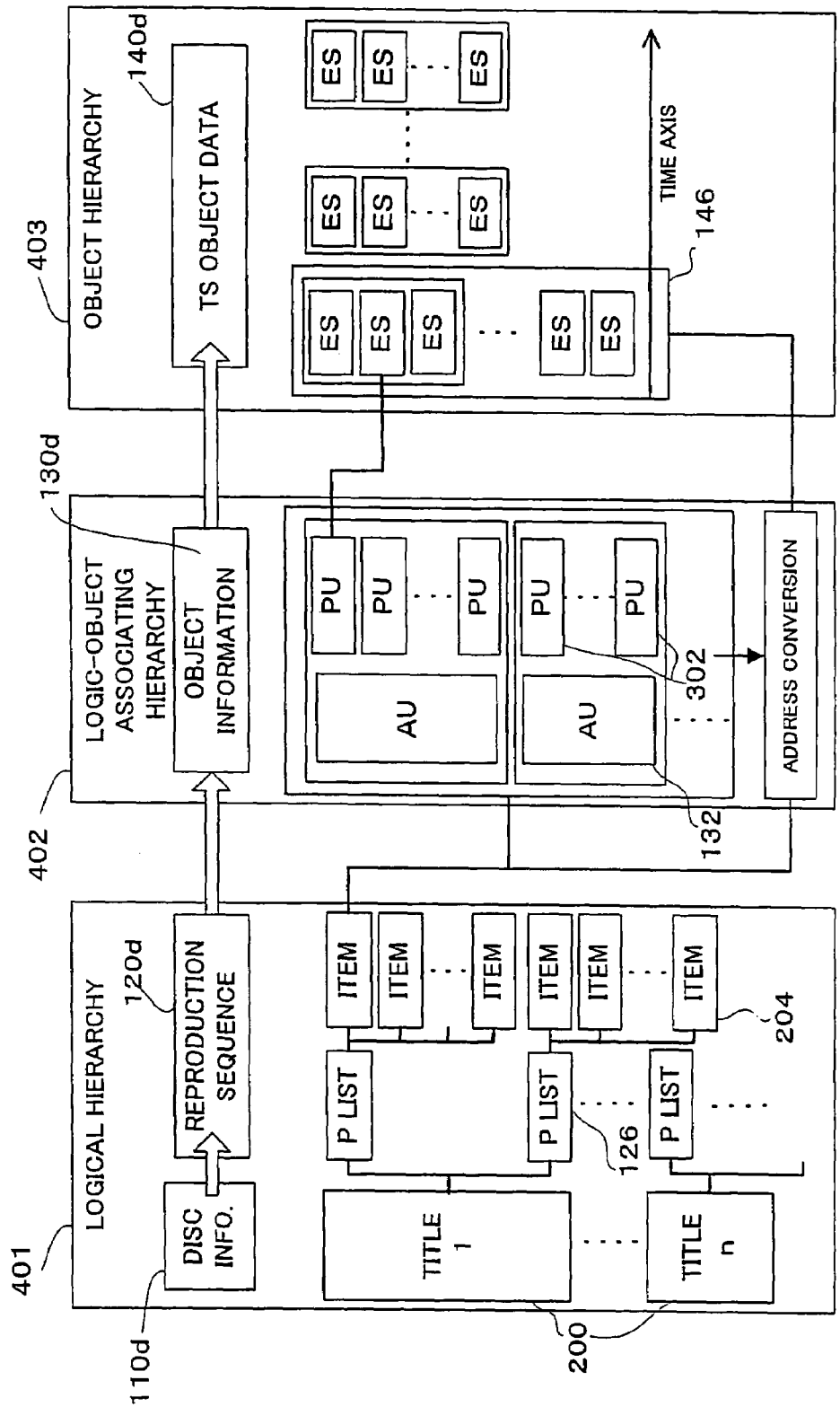
FIG. 30 is a schematic diagram showing an entire access flow in reproducing, in relation to the logical structure of the optical disc in the embodiment.

Next, with reference to FIG. 30, the flow of the access in reproducing at the information recording/reproducing apparatus 500, which uses the AU information 132 and the PU information 302, as one of the features of this embodiment, will be explained as well as the logical structure of the optical disc 100. FIG. 30 schematically shows an entire flow of the access in reproducing, in relation to the logical structure of the optical disc 100.

In FIG. 30, the logical structure of the optical disc 100 is categorized broadly into the following three hierarchies: a logical hierarchy 401; an object hierarchy 403; and a logic-object associating hierarchy 402 mutually associating those two hierarchies.

Among them, the logical hierarchy 401 is a hierarchy that logically specifies various logical information to reproduce the desired title when reproducing, as well as the play list (P list) to be reproduced and its construction content. In the logical hierarchy 401, disc information 110d indicating the entire titles 200 and the like on the optical disc 100 is written within the disc information file 110 (refer to FIG. 3), and further, reproduction sequence information 120d of the entire contents on the optical disc 100 is written within the play list information file 120 (refer to FIG. 3). More specifically, the construction of one or a plurality of play lists 126 is written in each title 200 as the reproduction sequence information 120d, and the construction of one or a plurality of Items 204 (refer to FIG. 7) is written in each play list 126. Then, in accessing at the time of the reproduction, the logical hierarchy 401 as described above specifies the title 200 to be reproduced, the play list 126 corresponding to this, and further the Item 204 corresponding to this.

Then, the logic-object associating hierarchy 402 is a hierarchy that specifies the attribute and the physical storing address of the TS object data 140d to be reproduced, so as to specify the combination and/or the construction of the TS object data 140d as being the entity data and perform an address conversion to the object hierarchy 403 from the logical hierarchy 401, on the basis of the information specified in the logical hierarchy 401 as described above. More specifically, in the logic-object associating hierarchy 402, the object information data 130d, which separates a group of the contents constituting each Item 204 into units of the AU 132 and which finely separates each AU 132 into units of the PU 302, is written in the object information file 130 (refer to FIG. 3).

Here, "the PU (Presentation Unit) 302" is a unit of associating and grouping a plurality of elementary streams for each unit of changing the reproduction. If there are three audio streams in this PU 302, the user can also freely change three audio (e.g. audio in different languages and the like) while reproducing this vision.

On the other hand, "the AU (Associate Unit) 132" is a unit of associating or grouping a plurality of elementary streams, such as the video stream, in the TS object used in one title, and is a group of one or a plurality of PUs 302. More specifically, the AU 132 is a unit of grouping the elementary stream packet ID (ES_PID) for each TS object, indirectly through the PU 302. This AU 132 corresponds to a group of a plurality of shows or programs mutually having a special relationship considering the contents, for example, a plurality of shows or programs mutually changeable in multiple broadcasting and the like. Then, the PU 302, which belongs to the same AU 132, corresponds to a group of one or a plurality of elementary streams which constitute a plurality of shows or programs mutually changeable by the user operation when reproducing.

Therefore, if the AU 132 to be reproduced is specified, and moreover, the PU 302 which belongs to the AU 132 is specified, then the elementary stream to be reproduced is specified. Namely, even if not using the PAT nor the PMT shown in FIG. 6, it becomes possible to reproduce the desired elementary stream from among the multiplexed and recorded elementary streams from the optical disc 100.

The more specific data structure of the AU information 132I and the PU information 302I, which respectively define the AU 132 and the PU 302 described above, will be explained later with reference to FIG. 34.

Here, the elementary stream that is actually reproduced is identified or specified by the ES_PID, which is the packet ID of the elementary stream (refer to FIG. 6), from the PU information 302I. At the same time, by converting the information indicating the starting time and the ending time of the reproduction to the address information of the elementary stream, the content in a specific area (or specific time range) of a specific elementary stream is reproduced.

In this manner, in the logic-object associating hierarchy 402, the address conversion to the physical address related to each PU 302 from the logical address related to each Item 204 is executed.

Then, the object hierarchy 403 is a physical hierarchy to reproduce the actual TS object data 140d. In the object hierarchy 403, the TS object data 140d is written within the object data file 140 (refer to FIG. 3). More specifically, the TS packets 146 constituting a plurality of elementary streams (ES) are multiplexed at each time point, and the arrangement of the TS packets 146 along the time axis enables a plurality of elementary streams to be constructed (refer to FIG. 5). Then, the plurality of TS packets 146 multiplexed at each time point are associated with the PU 302 identified at the logic-object associating hierarchy 402, for each elementary stream. Incidentally, it is also possible to associate a plurality of PUs 302 with one elementary stream (e.g. to share the elementary stream related to the same audio data and/or the elementary stream related to the same sub picture data, among a plurality of changeable shows or programs).

In this manner, in the object hierarchy 403, the actual object data is reproduced using the physical address obtained by the conversion at the logic-object associating hierarchy 402.

As described above, the three hierarchies shown in FIG. 30 allow the execution of the access with respect to the optical disc 100 in reproducing.

(Each Information File Structure)

Next, with reference to FIG. 31 to FIG. 34, various information files constructed on the optical disc 100 in the embodiment, i.e. the data structures of (1) the disc information file 110, (2) the play list information file 120, and (3) the object information file 130, which have been explained with reference to FIG. 3, will be explained using their own specific examples.

(1) Disc Information File:

Firstly, with reference to FIG. 31 and FIG. 32, the disc information file 110 will be explained in detail using one specific example. FIG. 31 schematically shows one specific example of the data structure of the disc information file 110. FIG. 32 schematically shows one specific example of the data structure of the title information table 114 included in the disc information file 110.

In this specific example as shown in FIG. 31, the disc information file 110 stores therein the disc comprehensive information 112, the title information table 114, and the other information 118.

Among them, the disc comprehensive information 112 is comprehensive information, such as disc volume information indicating the serial number of one series constructed by a plurality of optical discs 100, total title number information and so on.

The title information table 114 stores therein the entire play lists constituting each title and the other information, e.g. information for each title, such as chapter information within the title and the like, and includes title pointer information, title #1 information, title #2 information, and so on. Here, the "title pointer information" is the storing address information of the title #n information, i.e. the storing address information indicating the storing position of the title #n information in the title information table 114, as the correspondence relationship is indicated with arrows in FIG. 31, and the "title pointer information" is written with a relative logical address. Then, this information of the number of titles in the optical disc 100 is arranged in the order of the titles as the relative logical address. Incidentally, the data amount of each storing address information may be a fixed byte or a changeable byte.

The other information 118 is information about each title, such as the title type, for example, the sequential type, the branch type, and the like, and the total number of play lists.

For example, in the case where the title is simply provided with one play list, the title information table 114 stored in the disc information file 110 shown in FIG. 31 is written as a table having relatively simple contents as shown in FIG. 32.

Figure 33:
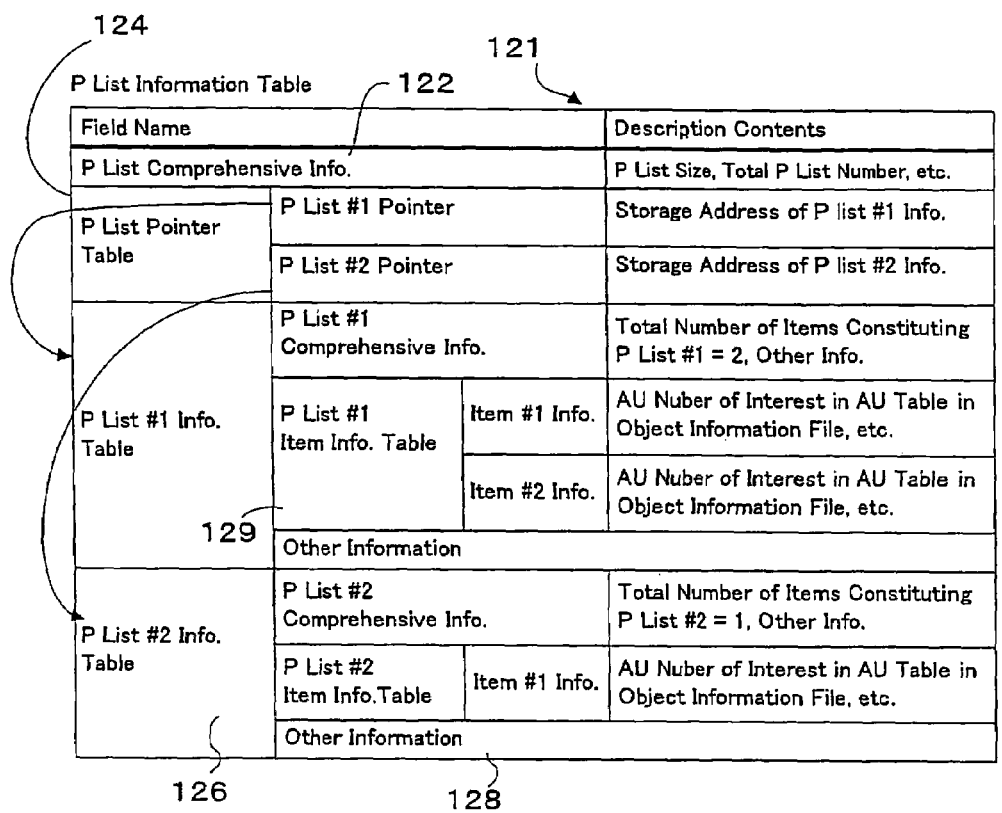
FIG. 33 is a schematic diagram showing one specific example of the data structure of a play list information table constructed in a play list information file in one specific example of the embodiment.

(2) Play List Information File:

Next, with reference to FIG. 33, the play list information file 120 will be explained in detail using one specific example. FIG. 33 schematically shows one specific example of the data structure on the play list information table 121 constructed in the play list information file 120.

In this specific example, as shown in FIG. 33, the play list information file 120 stores therein play list comprehensive information 122, a play list pointer table 124, and a play list #1 information table and a play list #2 information table 126, for each Field type, as the play list information table 121 (refer to FIG. 3).

Each Field may have a structure that allows the necessary number of each table to be added. For example, if there are four play lists, the relative Field may increase to four Fields under this structure, and so does the Item information table.

Among them, the play list comprehensive information (P list comprehensive information) 122 describes therein the size of the play list table, the total number of play lists, and the like.

The play list pointer table (P list pointer table) 124 stores therein the address of each play list written position as being the relative logical address in the play list information table 126, as the correspondence relationship is indicated with arrows in FIG. 33.

The play list #1 information table (P list #1 information table) 126 stores therein comprehensive information about the play list #1, the Item information table 129 of the play list #1 (P list Item information table) and the other information. The play list #2 information table 126 also stores therein the same type of information related to the play list #2.

The "Item information table 129" stores therein the Item information of the total number of Items constituting one program list. Here, an AU number in the AU (Associate Unit) table written in the "Item #1 (Item #1 information)" or the "Item #2 (Item #2 information)" is the number of the AU, which stores information for specifying the address of the TS object to be used for the Item reproduction, or specifying each elementary stream (i.e. the video stream, the audio stream, or the sub picture stream) in the TS object to be used for the Item reproduction.

(3) Object Information File:

Next, with reference to FIG. 34, the object information file 130 will be explained in detail using one specific example. FIG. 34 schematically shows one specific example of the data structures on the AU table 131 (refer to FIG. 3) constructed in the object information file 130 and on the ES map table 134 (refer to FIG. 3) related to the AU table 131.

In this specific example, as shown in FIG. 34, the object information file 130 stores therein object information tables. The object information tables comprise the AU table 131 shown in the upper part of FIG. 34 and the ES map table 134 shown in the lower part.

In the upper part of FIG. 34, the AU table 131 may have a structure that allow the necessary number of tables for each Field to be added. For example, if there are four AUs, the relative Field may increase to four Fields under this structure.

The AU table 131 stores therein "AU table comprehensive information" in which the number of AUs and the pointer to each AU, and the like are written, and "the other information."

The AU table 131 describes therein the Index number (Index number=. . . ) of the corresponding ES map table 134, as the AU information 1321 indicating an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which are changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, in the case of constructing multi-view contents with the AU, the AU stores therein a plurality of PUs, and each PU stores therein the pointers to a plurality of elementary stream packet IDs, which indicate the packets constituting the content of each view. This indicates the Index number in the ES map table 134, as described later.

In the embodiment, discontinuity information for indicating a discontinuous condition of the packet number may be given to the AU table 131, in the case where a packet or packets are lacked by the editing processing in the serial number of the packets in the above-described TS object 142. By using the discontinuity information, without giving a new packet number when a packet or packets are lacked, it is possible to specify the address of a packet which is an access object, by counting the number of packets in view of the discontinuous condition indicated by the discontinuity information (with a packet whose elementary stream is specified as a start point). Such discontinuity information includes information for the start point of discontinuity and the number of lacked packets, for example. As described above, the discontinuity information is commonly unified and written with respect to the plurality of AUs, which is extremely excellent from the viewpoint of saving the recording capacity. Incidentally, it is possible to write such discontinuity information in or out of the object information file except the AU table 131.

In the lower part of FIG. 34, the ES map table 134 stores therein ES map table comprehensive information, a plurality of Indexes #m (m=1, 2, . . . ), and the "other information", for each Field.

The "ES map table comprehensive information" describes therein the size of the ES map table, the total number of Indexes, and the like.

The "Index #m" includes the elementary stream packet IDs (ES_PIDs) of the entire elementary streams to be used for the reproduction, the corresponding Index numbers, and the address information of the elementary stream.

Particularly in the embodiment, if the elementary stream is the video stream of the MPEG 2 as described above, only the TS packet number of the TS packet at the head of the I picture and the corresponding display time length are written as the address information, i.e. the ES address information 134*d* on the ES map table 134, by which the data amount is tried to be reduced (refer to FIG. 14). On the other hand, with respect to the ES address information 134*d* of the sub picture stream, the SCP identification flag and the SP data identification flag are written in each entry section by writing the index number information 134*e* of the elementary stream used as the entry section. By this, the data amount is further tried to be reduced (refer to FIG. 20 and FIG. 24).

Because of the construction as described above, it is possible to obtain the elementary stream packet ID (ES_PID) of the actual elementary stream from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in the case of adding a new title to the optical disc 100, necessary information can be added easily, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 34, even the ES_PID that is not referred to from the AU table 131 in the upper part is described by the Index of the ES map table 134 in the lower part; however, it is not necessary to describe the ES_PID that is not referred to, in this manner. If the more versatile ES map table 134 is prepared in advance by describing the ES_PID that is not referred to in this manner, it is not necessary to reconstruct the ES map table in the case of reediting the content, such as trying the authoring operation again, which is advantageous.

As explained in detail with reference to FIG. 1 to FIG. 34, according to the embodiment, it is possible to efficiently multiplex and record the still picture data which is constructed from the bitmap data having a relatively large data amount, as the sub picture data, along with the video data and the audio data.

Moreover, it is possible to control the image output of the sub picture data by a plurality of image output control, to thereby image-output one sub picture with various forms. By maintaining the sub picture, it is possible to use the same data as different representation. Thus, it is possible to provide a device which is extremely simple for soft formation and which is rich in diversity.

Furthermore, by using one bit of the flag information, such as the SCP identification flag and the SP data identification flag, it is possible to efficiently perform the obtainment processing of the SP control information and the SP data and the reproduction control processing of the sub picture. In particular, the data amount required for the above processing is small, so that it is possible to save the recording capacity on the optical disc 100.

Incidentally, the optical disc 100 as one example of the information recording medium and a recorder or a player related to the optical disc 100 as one example of the information recording/reproducing apparatus are explained in the above described embodiment; however, the present invention is not limited to the optical disc, and the recorder or the player. The present invention is available for the other various information recording/reproducing media corresponding to the high density recording or the high transmission rate, and their recorders or players.

As explained above, according to this embodiment, it is possible to multiplex and record the still picture information having a relatively large data amount, along with the motion picture information (or the video information) and the audio information, and it is possible to reproduce the still picture information while inhibiting an increase in the load in the reproduction and display processing. Particularly, by adopting the still picture information set (e.g. the sub picture structure) associated with the present invention, to thereby operate the different still picture control information with respect to the still picture information associated with one sub picture and display it, it is possible to use the same still picture information for many different representation. By this, it is possible to save the recording capacity for the still picture/image having a large data amount. Moreover, by adopting the control information identification flag (e.g. the SCP identification flag) and the still picture information identification flag (e.g. the SP data identification flag) associated with the present invention, it is possible to efficiently perform the obtainment processing and reproduction control processing of the still picture information. By inhibiting a data amount required for the processing, it is possible to save the recording capacity as a whole.

The present invention is not limited to the above-described embodiments, and changes may be made if desired without departing from the scope or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal that accompany such changes are also intended to be within the technical scope of the present invention.

INDUSTRIAL APPLICABILITY

An information recording medium, a apparatus for and a method of recording the information, an apparatus for and a method of reproducing the information, an apparatus for and a method of recording and reproducing the information, a computer program for controlling the record or the reproduction, and a data structure including a control signal that are associated with the present invention can be applied to a high-density optical disc for consumer or industrial use, such as a DVD, on which various information, such as the video information, the audio information, the sub picture information, and the reproduction control information, can be recorded at high density and further can be applied to a DVD player, a DVD recorder, and the like. Moreover, they can be applied to an information recording medium, an information recording/reproducing apparatus, or the like, which are inserted in or can be connected to various computer equipment for consumer or industrial use, for example.

The invention claimed is:

1. An information recording medium on which content information, which includes still picture information, is recorded, said information recording medium comprising:
   an object data file for storing object data which comprises a plurality of packets including packets each storing therein a piece of the content information; and
   a reproduction sequence information file for storing reproduction sequence information which defines a reproduction sequence of the object data,
   wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set,
   with respect to at least one portion of the still picture information, a display control to the still picture information included in one still picture information set out of the still picture information sets is described by the still picture control information included in another still picture information set out of the still picture information sets, and
   the structural information includes at least one of an identifier of the still picture information, a data length of the still picture control information, a data length of the still picture information, and position information for indicating a recording position of the still picture information.

2. The information recording medium according to claim 1, wherein the structural information includes the identifier of the still picture information.

3. The information recording medium according to claim 1, wherein the still picture information set includes at least one of first and third still picture information sets and includes a second still picture information set, out of (i) the first still picture information set for including the still picture information, the still picture control information, and the structural information, (ii) the second still picture information set for including the still picture control information and the structural information but not including the still picture information, and (iii) the third still picture information set for including the still picture information and the structural information but not including the still picture control information.

4. The information recording medium according to claim 3, wherein a display control to the still picture information included in at least one of the first and third still picture information sets is described by the still picture control information included in the second still picture information set.

5. The information recording medium according to claim 3, wherein a display control to the still picture information included in at least one of the first and third still picture information sets is described by a plurality of the still picture control information included in a plurality of the second still picture information set, so as to perform a plurality of mutually different display controls.

6. An information recording apparatus for recording content information, which includes still picture information, onto an information recording medium,
   said information recording apparatus comprising:
   a first recording device for recording an object data file for storing object data which comprises a plurality of packets including packets each storing therein a piece of the content information; and
   a second recording device for recording a reproduction sequence information file for storing reproduction sequence information which defines a reproduction sequence of the object data,
   wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set,
   with respect to at least one portion of the still picture information, a display control to the still picture information included in one still picture information set out of the still picture information sets is described by the still picture control information included in another still picture information set out of the still picture information sets, and
   the structural information includes at least one of an identifier of the still picture information, a data length of the still picture control information, a data length of the still picture information, and position information for indicating a recording position of the still picture information.

7. The information recording apparatus according to claim 6, wherein the structural information includes the identifier of the still picture information.

8. An information recording method of recording content information, which includes still picture information, onto an information recording medium,
   said information recording method comprising:
   a first recording process of recording an object data file for storing object data which comprises a plurality of packets including packets each storing therein a piece of the content information; and
   a second recording process of recording a reproduction sequence information file for storing reproduction sequence information which defines a reproduction sequence of the object data,
   wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information set is described by the still picture control information included in another still picture information set out of the still picture information sets, and the structural information includes at least one of an identifier of the still picture information, a data length of the still picture control information, a data length of the still picture information, and position information for indicating a recording position of the still picture information.

9. The information recording method according to claim 8, wherein the structural information includes the identifier of the still picture information.

10. An information reproducing apparatus for reproducing recorded content information from an information recording medium on which the content information, which includes still picture information, is recorded, said information recording medium comprising: an object data file for storing object data which comprises a plurality of packets including packets each storing therein a piece of the content information; and a reproduction sequence information file for storing reproduction sequence information which defines a reproduction sequence of the object data, wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information sets is described by the still picture control information included in another still picture information set out of the still picture information sets, and the structural information includes at least one of an identifier of the still picture information, a data length of the still picture control information, a data length of the still picture information, and position information for indicating a recording position of the still picture information, said information reproducing apparatus comprising:

a reading device for reading information from said information recording medium; and a reproducing device for reproducing the object data included in the information read by said reading device on the basis of the reproduction sequence information included in the information read by said reading device.

11. The information reproducing apparatus according to claim 10, wherein the structural information includes the identifier of the still picture information.

12. An information reproducing method of reproducing recorded content information from an information recording medium on which the content information, which includes still picture information, is recorded, said information recording medium comprising: an object data file for storing object data which comprises a plurality of packets including packets each storing therein a piece of the content information; and a reproduction sequence information file for storing reproduction sequence information which defines a reproduction sequence of the object data, wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information sets is described by the still picture control information included in another still picture information set out of the still picture information sets, and the structural information includes at least one of an identifier of the still picture information, a data length of the still picture control information, a data length of the still picture information, and position information for indicating a recording position of the still picture information, said information reproducing method comprising:

a reading process of reading information from said information recording medium; and a reproducing process of reproducing the object data included in the information read by said reading process on the basis of the reproduction sequence information included in the information read by said reading process.

13. The information reproducing method according to claim 12, wherein the structural information includes the identifier of the still picture information.

14. A product for controlling record and for tangibly embodying a program of instructions executable by a computer to make the computer function as at least one portion of a first recording device and a second recording device, the computer being provided in an information recording apparatus for recording content information, which includes still picture information, onto an information recording medium by a unit of packet, said information recording apparatus comprising:

said first recording device for recording an object data file for storing object data which comprises a plurality of packets including packets each storing therein a piece of the content information; and said second recording device for recording a reproduction sequence information file for storing reproduction sequence information which defines a reproduction sequence of the object data, wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information sets is described by the still picture control information included in another still picture information set out of the still picture information sets, and the structural information includes at least one of an identifier of the still picture information, a data length of the still picture control information, a data length of the still picture information, and position information for indicating a recording position of the still picture information.

15. The product according to claim 14, wherein the structural information includes the identifier of the still picture information.

16. A product for controlling reproduction and for tangibly embodying a program of instructions executable by a computer to make the computer function as at least one portion of a reproducing device, the computer being provided in an information reproducing apparatus for reproducing recorded content information from an information recording medium on which the content information, which includes still picture information, is recorded by a unit of packet, said information recording medium comprising: an object data file for storing object data which comprises a plurality of packets including packets each storing therein a piece of the content information; and a reproduction sequence information file for storing reproduction sequence information which defines a reproduction sequence of the object data, wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information sets is described by the still picture control information included in another still picture information set out of the still picture information sets, and the structural information includes at least one of an identifier of the still picture information, a data length of the still picture control information, a data length of the still picture information, and position information for indicating a recording position of the still picture information, said information reproducing apparatus comprising:

a reading device for reading information from said information recording medium; and said reproducing device for reproducing the object data included in the information read by said reading device on the basis of the reproduction sequence information included in the information read by said reading device.

17. The product according to claim 16, wherein the structural information includes the identifier of the still picture information.

18. A data structure including a control signal, in which content information, which includes still picture information, is recorded by a unit of packet, comprising:

an object data file for storing object data which comprises a plurality of packets including packets each storing therein a piece of the content information; and a reproduction sequence information file for storing reproduction sequence information which defines a reproduction sequence of the object data, wherein the plurality of packets constituting the object data include packets each storing therein a piece of respective one of still picture information sets, the still picture information set including at least one of the still picture information and still picture control information for controlling display of the still picture information and further including structural information for indicating a structure of the still picture information set, with respect to at least one portion of the still picture information, a display control to the still picture information included in one still picture information set out of the still picture information sets is described by the still picture control information included in another still picture information set out of the still picture information sets, and the structural information includes at least one of an identifier of the still picture information, a data length of the still picture control information, a data length of the still picture information, and position information for indicating a recording position of the still picture information.

19. The data structure according to claim 18, wherein the structural information includes the identifier of the still picture information.

* * * * *